(12) United States Patent
Elangovan et al.

(10) Patent No.: US 10,688,918 B2
(45) Date of Patent: Jun. 23, 2020

(54) MOBILE DEVICE TETHERING FOR A REMOTE PARKING ASSIST SYSTEM OF A VEHICLE

(71) Applicant: Ford Global Technologies, LLC, Dearborn, MI (US)

(72) Inventors: Vivekanandh Elangovan, Canton, MI (US); Hamid M. Golgiri, Dearborn, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/860,284

(22) Filed: Jan. 2, 2018

(65) Prior Publication Data

US 2019/0202348 A1    Jul. 4, 2019

(51) Int. Cl.
| | |
|---|---|
| *G08G 1/01* | (2006.01) |
| *B60Q 1/48* | (2006.01) |
| *B60Q 1/50* | (2006.01) |
| *B60W 30/06* | (2006.01) |
| *G05D 1/00* | (2006.01) |

(52) U.S. Cl.
CPC ............. *B60Q 1/488* (2013.01); *B60Q 1/486* (2013.01); *B60Q 1/50* (2013.01); *B60W 30/06* (2013.01); *G05D 1/0016* (2013.01); *B60Q 2400/50* (2013.01); *B60W 2550/40* (2013.01)

(58) Field of Classification Search
None
See application file for complete search history.

(56) References Cited

U.S. PATENT DOCUMENTS

| | | | |
|---|---|---|---|
| 5,959,724 | A | 9/1999 | Izumi |
| 6,275,754 | B1 | 8/2001 | Shimizu |
| 6,356,828 | B1 | 3/2002 | Shimizu |
| 6,452,617 | B1 | 9/2002 | Bates |
| 6,476,730 | B2 | 11/2002 | Kakinami |
| 6,477,260 | B1 | 11/2002 | Shimomura |
| 6,657,555 | B2 | 12/2003 | Shimizu |
| 6,683,539 | B2 | 1/2004 | Trajkovic |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Julie B Lieu
(74) *Attorney, Agent, or Firm* — Frank Lollo; Neal, Gerber & Eisenberg LLP; James P. Muraff

(57) ABSTRACT

Method and apparatus are disclosed for mobile device tethering for a remote parking assist system of a vehicle. An example vehicle includes projection lamps and a body control module. The body control module determines a distance of a mobile device from the vehicle. The body control module also projects a representation of a boundary around the vehicle using the projection lamps and modifies the representation of the boundary based on the distance of the mobile device from the vehicle and an operational state of the vehicle.

20 Claims, 24 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters et al. |
| 6,850,148 B2 | 2/2005 | Masudaya |
| 6,850,844 B1 | 2/2005 | Walters et al. |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima et al. |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin et al. |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter et al. |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 * | 4/2014 | Talty ............... B60R 25/24 701/36 |
| 8,725,315 B2 | 5/2014 | Talty et al. |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama et al. |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker et al. |
| 9,381,859 B2 | 7/2016 | Nagata |
| 9,429,657 B2 | 8/2016 | Sidhu et al. |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan et al. |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu et al. |
| 9,715,816 B1 | 7/2017 | Adler et al. |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 * | 11/2018 | Kim ............... B60W 30/06 |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker et al. |
| 2009/0115639 A1 | 5/2009 | Proefke et al. |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Von Rehyer |
| 2010/0061564 A1 | 3/2010 | Clemow |
| 2010/0114471 A1 | 5/2010 | Sugiyama |
| 2010/0114488 A1 | 5/2010 | Khamharn et al. |
| 2010/0136944 A1 | 6/2010 | Taylor |
| 2010/0152972 A1 | 6/2010 | Attard |
| 2010/0156672 A1 | 6/2010 | Yoo |

(56) References Cited

U.S. PATENT DOCUMENTS

| | | |
|---|---|---|
| 2010/0245277 A1 | 9/2010 | Nakao |
| 2010/0259420 A1 | 10/2010 | Von Reyher |
| 2011/0071725 A1 | 3/2011 | Kleve et al. |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen et al. |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1* | 5/2015 | Jecker ............... B62D 15/025 701/23 |
| 2015/0149265 A1 | 5/2015 | Huntzicker |
| 2015/0151789 A1 | 6/2015 | Lee |
| 2015/0153178 A1 | 6/2015 | Koo et al. |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick et al. |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1* | 5/2016 | Ohshima ............... G05D 1/0061 701/23 |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1* | 5/2017 | Kim ............... B62D 15/0285 |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |

(56) References Cited

U.S. PATENT DOCUMENTS

| | | |
|---|---|---|
| 2017/0208438 A1 | 7/2017 | Dickow et al. |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1* | 2/2018 | Solar .................. B62D 15/0275 |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102009024083 A1 | 12/2010 |
| DE | 102009060169 A1 | 6/2011 |
| DE | 102012008858 A1 | 11/2012 |
| DE | 102011080148 A1 | 1/2013 |
| DE | 102011122421 A1 | 6/2013 |
| DE | 102012200725 A1 | 7/2013 |
| DE | 102013004214 A1 | 9/2013 |
| DE | 102010034129 B4 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014011864 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| DE | 102016214433 A1 | 2/2018 |
| DE | 102016224529 A1 | 6/2018 |
| DE | 102016226008 A1 | 6/2018 |
| EP | 2289768 A2 | 3/2011 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| FR | 3021798 A1 | 12/2015 |
| GB | 2344481 A | 6/2000 |
| GB | 2481324 A | 6/2011 |
| GB | 2491720 A | 12/2012 |
| GB | 2497836 A | 12/2012 |
| GB | 2517835 A | 3/2015 |
| GB | 2534471 A | 7/2016 |
| JP | 2000293797 A | 10/2000 |
| JP | 2004142543 A | 5/2004 |
| JP | 2004287884 A | 10/2004 |
| JP | 2005193742 A | 7/2005 |
| JP | 2009090850 A | 4/2009 |
| JP | 2014125196 A | 7/2014 |
| JP | 2014134082 A | 7/2014 |
| JP | 5586450 B2 | 9/2014 |
| JP | 5918683 B2 | 5/2016 |
| JP | 2016119032 A | 6/2016 |
| JP | 2018052188 A | 4/2018 |
| KR | 20090040024 A | 4/2009 |
| KR | 20100006714 A | 1/2010 |
| KR | 20130106005 A | 9/2013 |
| KR | 20160039460 A | 4/2016 |
| KR | 20160051993 A | 5/2016 |
| KR | 10164167 B | 7/2016 |
| WO | WO 2006/064544 A1 | 6/2006 |
| WO | WO 2008/055567 A1 | 5/2008 |
| WO | WO 2010/006981 A1 | 1/2010 |
| WO | WO 2011/141096 A1 | 11/2011 |
| WO | WO 2013/056959 A1 | 4/2013 |
| WO | WO 2013/123813 A1 | 8/2013 |
| WO | WO 2014/103492 A1 | 7/2014 |
| WO | WO 2015068032 A1 | 5/2015 |
| WO | WO 2015/193058 A1 | 12/2015 |
| WO | WO 2016046269 A1 | 3/2016 |
| WO | WO 2016/128200 A1 | 8/2016 |
| WO | WO 2016/134822 A1 | 9/2016 |
| WO | WO 2017/062448 A1 | 4/2017 |
| WO | WO 2017/073159 A1 | 5/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/112444 A1 | 6/2017 |
| WO | WO 2017/118510 A1 | 7/2017 |
| WO | WO 2017/125514 A1 | 7/2017 |

OTHER PUBLICATIONS

Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, *IParking: An Intelligent Indoor Location-Based Smartphone Parking Service*, Oct. 31, 2012, 15 pages.
Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.

(56) References Cited

OTHER PUBLICATIONS

Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Land Rover develops a smartphone remote control for its SUVs, James Vincent, Jun. 18, 2015.
Perpendicular Parking—https://prezi.com/toqmfyxriksl/perpendicular-parking/.
Search Report dated Jan. 19, 2018 for GB Patent Application No. 1711988.4 (3 pages).
Search Report dated Jul. 11, 2017 for GB Patent Application No. Enter 15/583,524, pp. (3).
Search Report dated May 21, 2018 for Great Britain Patent Application No. GB 1800277.4 (5 Pages).
Search Report dated Nov. 28, 2017, for GB Patent Application No. GB 1710916.6 (4 Pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
ChargeItSpot Locations, Find a Phone Charging Station Near You, retrieved at https://chargeitspot.com/locations/ on Nov. 28, 2017.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
SafeCharge, Secure Cell Phone Charging Stations & Lockers, retrieved at https://www.thesafecharge.com on Nov. 28, 2017.
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2018 for GB Patent Application No. GB 1809842.6 (5 pages).

* cited by examiner

MOBILE DEVICE TETHERING FOR A REMOTE PARKING ASSIST SYSTEM OF A VEHICLE

RELATED APPLICATIONS

This application is related to U.S. Ser. No. 15/860,242, U.S. Ser. No. 15/860,394, U.S. Ser. No. 15/860,414, U.S. Ser. No. 15/860,269, U.S. Ser. No. 15/860,420, U.S. Ser. No. 15/860,299, all of which are filed on the same day as the present application and all of which are hereby incorporated by reference in their entirety.

TECHNICAL FIELD

The present disclosure generally relates to autonomous and semi-autonomous vehicles and, more specifically, mobile device tethering for a remote parking assist system of a vehicle.

BACKGROUND

A remote parking assist (RePA) system is designed to autonomously park a vehicle. The RePA system may be used when an operator of the vehicle is sitting in the driver's seat and not grasping the steering wheel. Often, the RePA system is used when the operator is outside the vehicle. The operator triggers the RePA system to park or un-park a vehicle into or out of a parking space using a mobile device wirelessly communicating with the vehicle. Governments are developing regulations to require that control of RePA with the mobile device shall only be allowed when the remote device is within a certain distance of the vehicle. For example, the proposed European regulation requires the mobile device to be within 6 meters of the nearest point of the motor vehicle (see Economic Commission for Europe, Regulation No. 79) in order for the vehicle to autonomously park. However, it is difficult to accurately measure a distance of 6 m from the nearest point of the vehicle with the wireless technologies commonly available on commercial mobile devices. For example, civilian frequencies for global positioning system (GPS) receivers have a 4 meter root mean squared (RMS) horizontal accuracy. As a consequence, comparing the GPS coordinates of the mobile device and the GPS coordinates of the vehicle is not accurate enough to meet the governmental requirements.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for mobile device tethering for a remote parking assist system of a vehicle. An example vehicle includes projection lamps and a body control module. The body control module determines a distance of a mobile device from the vehicle. The body control module also projects a representation of a boundary around the vehicle using the projection lamps and modifies the representation of the boundary based on the distance of the mobile device from the vehicle and an operational state of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
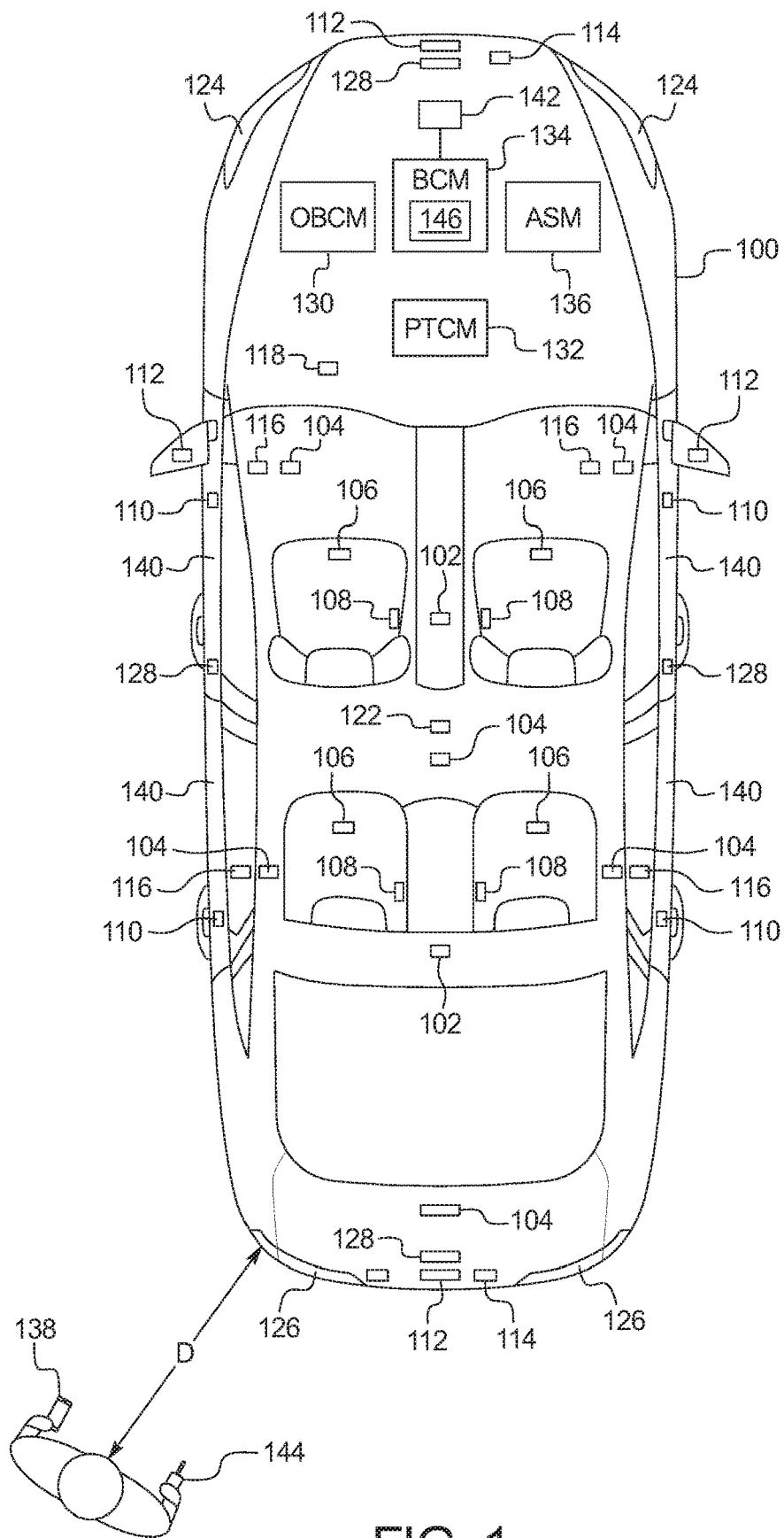
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) systems are designed to autonomously park and un-park vehicles when the operator is outside the vehicle. For example, RePA systems may be used when a parking spot is too narrow for the operator to open the door, or passengers to open their doors, when the vehicle is parked. RePA systems use range detection sensors (e.g., ultrasonic sensors, radar, LiDAR, cameras, etc.) to sense the environment around the parking spot and plan and execute a path into and out of the parking spot. In some examples, the RePA system is activated by the operator and scans for an available parking space. When a parking space is detected, the RePA system signals, via an interface (e.g., a center console display, etc.) for the operator to stop the vehicle near the detected parking spot. The operator then exits the vehicle. RePA systems are further activated via mobile devices (e.g., smartphone, smart watch, key fob, etc.) to complete the autonomous parking. In jurisdictions that require the mobile device to stay within a threshold distance of a vehicle, the RePA system tracks the location of the mobile device in relation to the location of the vehicle and determines whether the mobile device is within the threshold distance. When the mobile device is outside the threshold distance from the vehicle, the RePA system will not autonomously move the vehicle.

RePA systems may use various techniques to determine the location of the mobile device relative to the location of the vehicle, such as dead reckoning and signal triangulation. Mobile device dead reckoning uses the inertial sensors (e.g., accelerometers, gyroscopes, etc.) in the mobile device to determine the current location of the mobile device based on a previous location (sometimes referred to as a "fix"). As the mobile device moves, the RePA system tracks the movement by tracking the distance and direction the mobile device has traveled relative to the initial location. To perform mobile device dead reckoning, the RePA system determines the initial location by establishing the location of the mobile device in relation to the location of the vehicle. However, establishing that relationship can be difficult. Additionally, dead reckoning is subject to cumulative error. Over time and distance, the error becomes large enough causing the location calculations to not be accurate enough for the RePA system. As a result, from time-to-time (e.g., after a threshold time, after a threshold distance, etc.), the RePA system reestablishes an initial location of the mobile device. For example, when an operator leaves the vehicle and goes shopping, to perform mobile device dead reckoning, the RePA system needs to reestablish the location of the mobile device relative to the location of the vehicle because of the cumulative error. One localization technique is to use the signal strength(s) of signals between the antenna of the mobile device and antenna(s) of the vehicle. By using a measurement of the strength of the signals (e.g., a received signal strength indicator (RSSI), a transmission strength (RX) a received channel power indicator (RCPI), etc.), the RePA system can estimate a location of the mobile device. The accuracy of the estimation depends on several factors, such as how many signal strength measurements from different vehicle antennas are being used, the frequency of the signal, the distance between the antenna of the mobile device and the antenna(s) of the vehicle, and interference of the environment around the vehicle, etc. In addition to mobile device dead reckoning, the RePA system performs vehicular dead reckoning. Since the vehicle moves during a RePA event, the system must estimate the real-time location of the vehicle to properly compare it with the estimated location of the mobile device. For example, even if the mobile device is stationary during the RePA event, the distance between the mobile device and vehicle will change as a result of the movement of the vehicle. Vehicular dead reckoning can be performed using the transducers already resident to typical vehicles, such as the steering wheel angle sensor and rotary encoders that are used for odometry. The vehicle can also perform dead reckoning using similar methods to mobile device dead reckoning (e.g. accelerometers, gyroscopes, etc.), but the vehicle-specific hardware is likely to produce more accurate results. As discussed below, the RePA system of the present disclosure uses dead reckoning and localization, singly and in combination, with various techniques to overcome the errors in the location determination methods and determine whether the mobile device is within a threshold distance of the vehicle.

As discussed below, the RePA system determines an initial location of the mobile device when the mobile device exits the vehicle. The RePA system assigns an initial location to the mobile device based on which door the mobile device exits the vehicle through. For example, when the mobile device exits the vehicle through the driver's side front door, the RePA system may assign a location on the door (e.g., the location of the door handle, etc.) to be the initial location of the mobile device. The RePA system then uses dead reckoning to track the location of the mobile device based on that initial location. To determine through which door the mobile device exits, the RePA system uses (a) one or both of (i) a comparison of signal strengths between at least one internal wireless antenna (e.g., an antenna of a Bluetooth® module located inside the cabin of the vehicle, etc.) (sometimes referred to as an "internal signal strength") and at least one external antenna (e.g., an antenna of a Bluetooth® module located proximate a door of the vehicle, etc.) (sometimes referred to as an "external signal strength") to the antenna of the wireless device, and (ii) the direction of movement of the mobile device as indicated by the inertial sensors of the mobile device, and (b) context clues from sensors in the cabin of the vehicle. The context clues are provided by sensors that indicate the movement or presence of the occupants, such as weight sensors, seat belt sensors, and/or door angle sensors, etc.

In some examples, the vehicle includes at least one internal antenna and multiple external antennas. In such examples, using the signals from the various antennas, the RePA system determines which side of the vehicle at which the mobile device exits the vehicle. In such examples, the RePA system determines through which door the mobile device exited based on (a) which side of the vehicle through which the mobile device exited and (a) context clues indicative of the occupant no longer occupying a particular seat in the vehicle. For examples, the mobile device exited through the passenger's side of the vehicle, and at substantially the same time (e.g., plus or minus one second, two seconds, etc.), the weight sensor indicates that an occupant has left the front passenger's side seat, the RePA system determines that the mobile device exited through the front passenger's side door. Alternatively, in some examples, the vehicle either does not include internal antenna(s) or multiple external antennas to distinguish which side of the vehicle through which the mobile device exited. In such examples, the RePA system determines which side of the vehicle through which the mobile device exited based on measurements from the inertial sensors of the mobile device.

As discussed below, the vehicle includes proximity sensors. When the mobile device is in the vicinity of the vehicle (e.g., as determined though GPS coordinates and/or localization, etc.) and a new initial location of the mobile device is required, the RePA system instructs the operator, via a corresponding application executing on the mobile device to place the mobile device proximate to one of the proximity sensors. The proximity sensors represent a fixed reference point on the vehicle. In some examples, the proximity sensors are near field communication (NFC) devices that communicatively couple to the mobile device when the mobile device is within range (e.g., 10 centimeters, etc.). Alternatively, the proximity sensors are wireless charging modules (e.g., Qi® modules, etc.) that detect the mobile device when within a threshold range (e.g., 5-7 millimeters, etc.) of the wireless charging module. Alternatively, in some examples, the proximity sensors are pressure sensors or switches that detect when the mobile device comes in contact with the proximity sensor. Alternatively, in some examples, the proximity sensors are wireless modules (e.g., Bluetooth® modules, etc.) that determine that the mobile device is proximate the wireless module when signal strength indicates that the mobile device is within a threshold distance (e.g., 10 millimeters, etc.) to the wireless module.

The proximity sensors are located on areas that are accessible to the operator when the vehicle is parked in a narrow parking spot. In some examples, the proximity sensors are located near the rear license plate and the vehicle badge. Additionally, in some examples, the proximity sensors are located on the housing of the side view mirrors and/or one or more door handles of the vehicle. In some examples, the RePA system can be activated via the proximity sensors. In such examples, bringing the mobile device within range of the proximity sensors (a) automatically starts the corresponding RePA application on the mobile device, (b) unlocks the corresponding RePA application on the mobile device, (c) automatically presents the operator with a user default RePA state, (d) causes the corresponding RePA application on the mobile device to present the operator with available parking maneuver options, and/or (d) automatically starts the engine of the vehicle.

As discussed below, the RePA system, via the corresponding application executing on the mobile device, instructs the operator to perform a specific action, and determines the location of the mobile device based on that action. In some examples, the RePA system instructs the operator to hold the mobile device perpendicular to the longitudinal axis of the vehicle in view of one of the cameras (e.g., a forward-facing camera, a rear-view camera, a 360 degree camera, etc.). The RePA system takes an image of the mobile device. Using a database of mobile device specifications and/or specifications provided when the corresponding RePA application is installed on the mobile device, the RePA system determines the relative location of the mobile device based on the scale difference between the dimensional measurements of the mobile device in the image and the reference dimensional measurements in the database of mobile device specifications. In some examples, the RePA system instructs the user to capture an image of a certain feature of the vehicle (e.g., a license plate frame, a sicker affixed the vehicle, etc.). In such examples, the RePA system determines the relative location of the mobile device based on differences in dimensional measurements of the feature in the image and reference dimensional measurements of the feature. In some examples, the RePA system instructs the operator to point a flash of the mobile device at a camera of the vehicle. In some such examples, the RePA system communicates with the mobile device using a form of visible light communication, such as Li-Fi. In some such example, the RePA system determines the distance to the mobile device based on a measured light intensity of the flash compared to an expected light intensity. In some such examples, the mobile device repeats a pattern of different predetermined light intensities of the flash for the RePA system to use to determine the distance. For example, the mobile device may gradually increase the brightness of its flash from 0% to 100% in a timeframe established between the mobile device and the RePA system.

As discussed below, in some examples, the RePA system uses the mobile device and a key fob to determine the location of the mobile device relative to the location of the vehicle. Generally, the key fob communicates with the vehicle at a lower frequency (e.g., 315 MHz to 902 MHz) than the mobile device (e.g., 2.4 GHz). Additionally, key fob polling is performed using a low frequency signal (e.g., 125 kHz, etc.). As such, localization techniques using the key fob polling signal are generally more accurate than the localization using the mobile device signals. Because key fobs have limited batteries, the RePA system conserves power by changing the intervals between key fob polling signals based on the relationship between the mobile device and the vehicle. As used herein, "decreasing the polling interval" refers to decreasing a number of polling signals broadcast over a unit period of time (e.g., one second, thirty seconds, etc.) and "increasing the polling interval" refers to increasing the number of polling signal broadcast over the unit period of time. The RePA system determines the trajectory (e.g., the speed and the direction) of the vehicle and the trajectory of the mobile device to determine whether the location of the vehicle and the mobile device are converging (e.g., getting closer) or diverging (e.g., getting farther away). Using localization techniques, the RePA system determines a region of probability for the key fob. The region of probability represents an area that contains the location of the key fob taking into account the error in the estimation. That is, instead of representing a single location, the region of probability represents a set of possible locations of the key fob based on the error in the localization technique.

When the region of probability is within the RePA boundary and the distance between the vehicle and the mobile device is decreasing, the RePA system decreases or suspends the interval of polling of the key fob. In such a scenario, when the location of the mobile device and the vehicle are converging within the RePA boundary, the mobile device will not exit the boundary and thus tracking the location of the operator is less important. When the region of probability is within the RePA boundary and the distance between the vehicle and the mobile device is increasing, the RePA system resumes the key fob polling if it has been suspended and the increases the polling interval as the vehicle moves further away from the mobile device in order to more quickly detect if the operator has moved out of range. In some examples, the RePA system may change the polling interval as a function of vehicle velocity relative to the mobile device. For example, the increase in the polling interval may be greater the faster the relative speed of the vehicle. In such a scenario, the operator may leave the RePA boundary and thus increasing location tracking of the operator facilitates more quickly determining when the operator crosses the boundary.

As discussed below, the RePA system tracks the location (or ring of possible locations) of the mobile device using localization techniques on the mobile device and an associated key fob. Initially, the key fob polling for the RePA system is off (that is, the RePA system does not cause the key fob polling; though another system, such as keyless entry, may independently instigate key fob polling). Using localization techniques on the signals from the mobile device, the RePA system determines a region of probability representative of possible locations of the mobile device based on the location determined by localization and its associated error. The RePA system compares the region of probability to the boundary. When the region of probability is entirely outside of the boundary, the RePA system determines that the mobile device is outside of the boundary. When the region of probability is entirely inside the boundary, the RePA system determines that the mobile device is inside the boundary. When the boundary is partially within the region of probability, the RePA system activates polling of the key fob and determines the location of the key fob using localization. When the key fob is within the boundary, the RePA system determines the mobile device is within the boundary.

As discussed below, the RePA system provides a visual indicator of the mobile device's location relative to the location of the boundary. In some examples, the visual indicator is a manipulation of brightness, color, and/or activation of the lights of the vehicle (e.g., the head lights, the tail lights, a light emitting diode (LED) strip, etc.). Additionally or alternatively, in some examples, the vehicle includes projectors that project the boundary. In some such examples, the projection changes based on the mobile device's location relative to the location of the boundary. The visual indicator has different outputs when (a) the RePA system is active but the mobile device is not detected by the RePA system, (b) the RePA system is active and the mobile device is outside the boundary, (c) the RePA system is active, the mobile device is inside the boundary, and the vehicle is in motion, (d) the RePA system is active, the mobile device is inside the boundary, and the vehicle is stationary, and (e) the RePA system is active and the mobile device is inside the boundary near the boundary (e.g., within 0.5 meters of the boundary, etc.).

Figure 2:
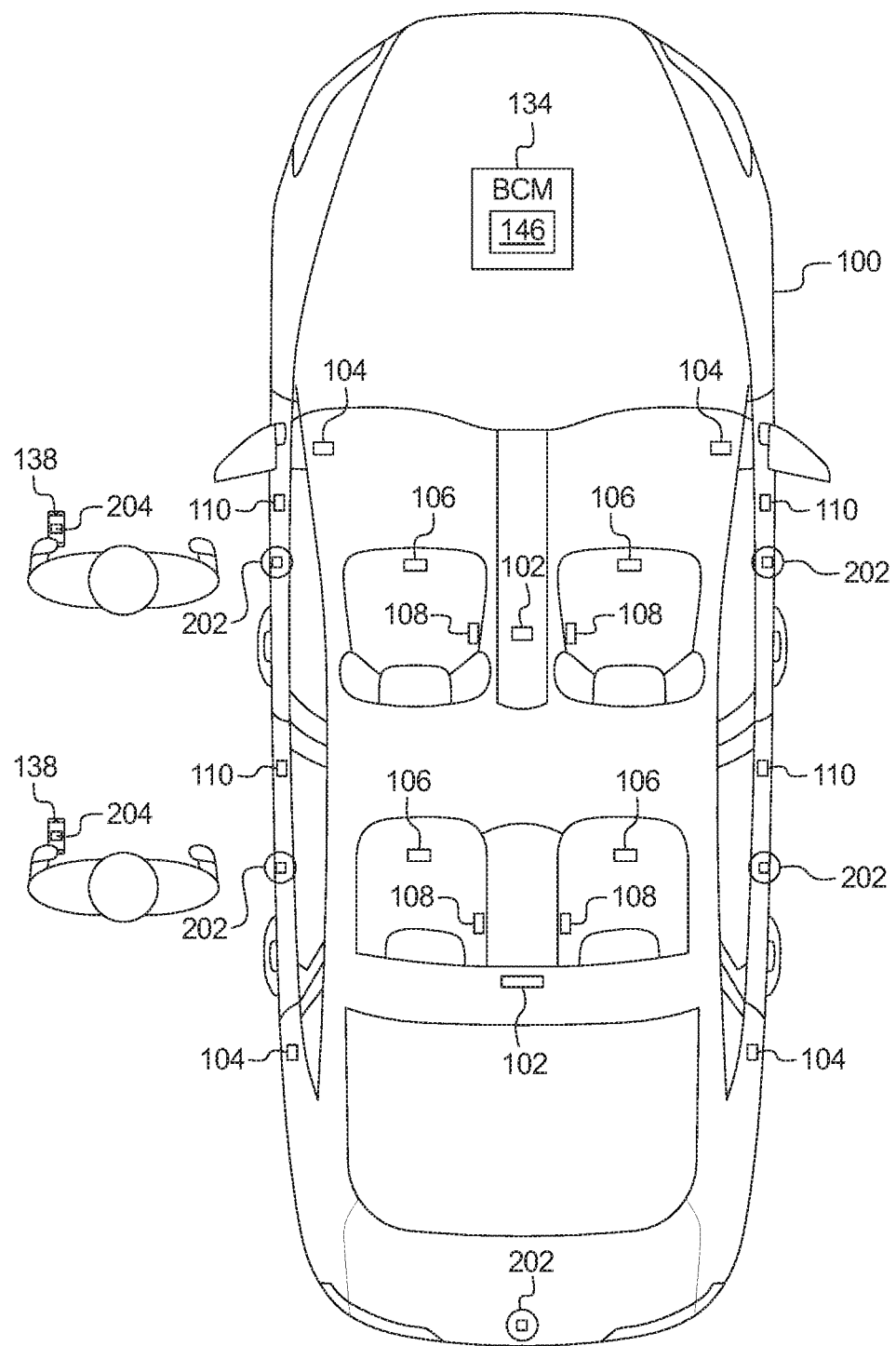
FIG. 2 illustrates the vehicle of FIG. 1 configured to determine an initial location of a mobile device when the mobile device exits the vehicle.

FIGS. 1 and 2 illustrate a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is a semi-autonomous (e.g., some routine motive functions controlled by the vehicle 100), or autonomous (e.g., motive functions are controlled by the vehicle 100 without direct driver input). The example vehicle 100 includes wireless nodes 102 and 104, occupant detection sensors 106, 108, and 110, proximity sensors 112, camera(s) 114, trajectory sensors 116, 118, and 122, lights 124 and 126, projector lamps 128, an on-board communication module (OBCM) 130, a powertrain control module (PTCU) 132, a body control module (BCM) 134, and/or an active safety module (ASM) 136.

The wireless nodes 102 and 104 include hardware (e.g., processors, memory, storage, antenna, etc.) and software to control wireless network interface(s). The wireless nodes 102 and 104 include a communication controller for a personal or local area wireless network (e.g., Bluetooth®, Bluetooth® Low Energy (BLE), Zigbee®, Z-Wave®, Wi-Fi®, etc.). In some examples, when the wireless nodes 102 and 104 are configured to implement BLE, the wireless nodes 102 and 104 may be referred to as "BLE Antenna Modules (BLEAMs)." The wireless nodes 102 and 104 communicatively couple to the mobile device 138 and measure and/or receive measurements of the signal strength of the signals broadcast by the mobile device 138. In some examples, the vehicle 100 includes one or more internal wireless nodes 102 located inside a cabin of the vehicle 100. Alternatively or additionally, in some examples, the vehicle 100 includes one or more external wireless nodes 104 located on the exterior of the vehicle 100. In some such examples, the external wireless nodes 104 are located on a roof of the vehicle 100, on a hood of the vehicle 100, at the rear of the vehicle 100, and/or proximate to one or more of doors 140 of the vehicle 100.

The occupant detection sensors 106, 108, and 110 are associated with particular seats in the vehicle 100 and provide indicators of (a) whether a person is occupying the associated seat, and (b) whether the occupancy of the associated seat has changed. The occupant detection sensors 106, 108, and 110 include weight sensors 106, seat belt sensors 108, and/or door angle sensors 110. Additionally, or alternatively, in some examples, the occupant detection sensors 106, 108, and 110 include door latch sensors and/or window position sensors and/or IR detection sensors. The weight sensors 106 detect whether an associated seat is occupied. The status of the weight sensor 106 changing from occupied to non-occupied is indicative of the occupant of the associated seat having exited the vehicle 100. The seat belt sensors 108 detect whether the seat belt associated with a particular seat is fastened. The status of the seat belt sensor 108 changing from fastened to un-fastened may be indicative of the occupant of the associated seat having exited the vehicle 100. The door angle sensors 110 detect the angle at which the associated door 140 is opened. The door angle sensors 110 indicating that the door has transitioned from a closed position to an open position sufficient for egress may be indicative of the occupant of the associated seat having exited the vehicle 100.

The proximity sensors 112 detect when the mobile device 138 is proximate to the proximity sensors 112. In some examples, the proximity sensor 112 is a module that wirelessly couples to the mobile device 138 at a relatively short range (e.g., an NFC module with a 10 cm range, a Qi module with a 5-7 millimeters, etc.). Alternatively or additionally, in some examples, the proximity sensors 112 are wireless modules (e.g., Bluetooth® modules, etc.) that detect that the mobile device 138 is proximate to the proximity sensor 112 by comparing the wireless signal strength of signals from the mobile device 138 to a threshold calibrated to determine when the mobile device 138 is relatively close (e.g., 10 mm, etc.) to the proximity sensor 112. In some such examples, the external wireless module(s) 104 also are configured to be the proximity sensors 112. For example, when one of the external wireless nodes 104 is installed in the handle of one of the doors 140, the external wireless nodes 104 is configured to determine when the mobile device 138 is within 10 mm of the door handle. Alternatively, in some examples, the proximity sensors 112 are pressure sensors and/or switches that activate when the mobile device 138 is physically pressed against the proximity sensor 112. In some such examples, the proximity sensors 112 are pedestrian impact detection sensors. The pedestrian impact detection sensors include a low force switch and high force switch are on/off cell type switches with different pressure activation thresholds and a linear potentiometer. The pedestrian impact detection sensors detect an impact width, a position of impact, a duration of impact, and a magnitude of impact pressure.

The cameras 114 capture images and video of the area proximate to the vehicle 100. The cameras 114 include a forward-facing camera (e.g., located on a back of rear-view mirror housing, etc.), a rear-view camera, and/or a 360° camera system. The 360° camera system includes multiple cameras that have their respective captured images stitched together to provide a view around the vehicle 100. For example, one camera is in the middle of the front grille, two cameras are ultra-wide-angle cameras on the side view mirrors, and a camera is above a license plate of the vehicle 100.

The trajectory sensors 116, 118, and 122 measure the speed and/or direction of travel of the vehicle 100. The trajectory of the vehicle 100 is determinable using these measurement. The trajectory sensors 116, 118, and 122 include a wheel speed sensors 116, a steering angle sensor 118, and an rate sensors 122. The wheel speed sensors 116 are mounted on the wheel assembly of each of the wheels to measure the rotational speed of the wheels. The steering angle sensor 118 is located in the steering column of the vehicle 100 and measures the steering wheel position angle and rate of turn. The rate sensors 122 include yaw sensors, roll sensors, pitch angle sensors, and/or accelerometers. The rate sensors 122 measure the change in angle over time such as yaw angle rate, roll angle rate, or pitch angle rate of the vehicle 100. The rate sensors also 122 measures the accelerations on the vehicle 100. In some examples, rate sensors 122 are incorporated into a restraint control module and/or a traction control module.

The lights 124 and 126 include head lights and tail lights. Additionally or alternatively, in some examples, the lights 124 and 126 include strips of LED lights embedded into one or more sides of the body of the vehicle 100 so as to be visible by a person standing at least within the boundary of the RePA system. The lights 124 and 126 include multiple settings that facilitate communication of different states of the RePA system. In some examples, the lights 124 and 126 are dimmable to facilitate communication of the different states via the brightness of the lights 124 and 126. Alternatively or additionally, in some examples, the light 124 and 126 include multiple independently controllable segments to facilitate communication of the different states via which segments are illuminated. For example, a vehicle 100 may include lights 124 and 126 that are a strip of LEDs, where each LED in the strip is independently controllable. In such an example, the state of the RePA system may be communicated by a number of LEDs that are illuminated.

The projector lamps 128 are lights that project an image on the ground in the vicinity of the vehicle 100. The projector lamps 128 are located on the vehicle 100 so that the projector lamps 128 project a visible boundary line at the threshold distance for the RePA system (e.g., 6 meters, etc.). For example, the projector lamps 128 may be at positions proximate the vehicle badge on the front of the vehicle 100, on the bottom of a side view mirrors, and below the license plate on the rear of the vehicle 100. The projector lamps 128 include multi-color lights (e.g., multicolor LEDs, etc.) to facilitate the projector lamps 128 projecting the boundary in different colors. Additionally, in some examples, the projector lamps 128 have different luminosity settings (e.g., higher lumen output for daytime, lower lumen output for nighttime, etc.).

The on-board communication module 130 (sometimes referred to as a "telematics unit") manages communication with the wireless nodes 102 and 104 and/or the proximity sensors 112. Additionally, in some examples, the on-board communication module 130 includes wired or wireless network interfaces to enable communication with external networks. In some such examples, the on-board communication module 130 includes hardware (e.g., processors, memory, storage, antenna, etc.) and software that communicate via cellular networks (Global System for Mobile Communications (GSM), Universal Mobile Telecommunications System (UMTS), Long Term Evolution (LTE), Code Division Multiple Access (CDMA), etc.), wireless local area networks (WLAN) (including IEEE 802.11 a/b/g/n/ac or others, dedicated short range communication (DSRC), visible light communication (Li-Fi), etc.), and/or wide area networks (Wireless Gigabit (IEEE 802.11ad), etc.). In some examples, the on-board communication module 130 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The powertrain control module 132 includes hardware and firmware to control the ignition, fuel injection, emission systems, transmission and/or the brake system of the vehicle 100. The powertrain control module 132 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. Additionally, the powertrain control module 132 monitors and communicates the measurements of the trajectory sensors 116, 118, and 122. The powertrain control module 132 sends messages via a vehicle data bus (e.g., via the vehicle data bus 1302 of FIG. 13) regarding the state of the engine (e.g., running, idling, stopped, etc.).

The body control module 134 controls various subsystems of the vehicle 100. For example, the body control module 134 may control power windows, power locks, an immobilizer system, and/or power mirrors, etc. The body control module 134 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the body control module 134 is communicatively coupled to a remote keyless entry system 142 that receives signals from a key fob 144 to control functions of the vehicle 100. The remote keyless entry system 142 sends polling signals requesting the key fob 144 to measure the polling signal strength between the vehicle 100 and the key fob 144 and to report back the polling signal trength to the remote keyless entry system 142. In the illustrated examples, the body control module 134 includes a boundary monitor 146 that (a) tracks a distance (D) between the mobile device 138 and/or the key fob 144 and the vehicle 100, (b) determines whether the mobile device 138 and/or or the key fob 144 are within the threshold distance to the vehicle 100 and (c) controls various subsystems (e.g., the lights 124 and 126) of the vehicle 100 based on that determination.

The boundary monitor 146 tracks when the last time the vehicle 100 determined a fix of the mobile device 138. When the time elapsed since the last fix and/or a distance traveled since the last fix satisfies corresponding thresholds, as discussed in connection with FIGS. 2, 3, 4A, 4B, 5, 6, 15, 16, 17, 18, and 19 below, the boundary monitor 146 obtains a new fix from the mobile device 138. The boundary monitor 146 tracks the location of the mobile device 138 and/or the key fob 144 using dead reckoning (e.g., receiving data from inertial sensors of the mobile device 138, etc.) and/or localization techniques (e.g., via the wireless nodes 102 and 104, via the remote keyless entry system 142, etc.). As discussed in connection with FIGS. 7, 8A, 8B, 8C, 20, and 21 below, the boundary monitor 146 tracks whether the mobile device 138 and/or the key fob 144 are within the threshold distance (e.g., 6 meters, etc.) that defines the boundary. The boundary monitor 146 notifies the user of the location of the mobile device 138 and/or the key fob 144 relative to the location of the boundary as discussed in connection with FIGS. 9, 10A, 10B, 10C, 11A, 11B, 11C, 12A, 12B, 12C, and 22 below.

The active safety module 136 controls autonomous functions of the vehicle 100. More specifically, the active safety module 136 of the illustrated example includes a system to autonomously park and un-park a vehicle 100 when an operator is outside of the vehicle (sometime referred to as "remote parking," "vehicle remote park-assist," "remote park-assist," and "RePA"). For example, the RePA system of the active safety module 136 controls the motive functions of the vehicle upon initiation from the mobile device 138 to remotely park the vehicle into a parking spot. The RePA system of the active safety module 136 uses range detection sensors (e.g., ultrasonic sensors, radar, LiDAR, cameras, etc.) to sense the environment around a vehicle to detect a parking spot. When activated via the mobile device 138 that is within the boundary, the RePA system of the active safety module 136 plans and executes a path into or out of the parking spot. In some examples, the RePA system is activated by the operator and scans for an available parking space. When a parking space is detected, the RePA system signals, via an interface (e.g., a center console display, etc.) for the operator to stop near the detected parking spot. The operator then exits the vehicle 100. The RePA system of the active safety module 136 is activated via the mobile devices 138 to autonomously maneuver the vehicle 100 into the parking spot according to the planned path. When the mobile device 138 is outside of the boundary, the RePA system will not autonomously move the vehicle 100. As discussed below, because the vehicle 100 is in motion during the remote parking maneuvers, the boundary moves with the vehicle 100. As such, the mobile device 138 may, for example, transition to be outside of the boundary even if the mobile device 138 is stationary.

FIG. 2 illustrates the vehicle 100 of FIG. 1 configured to determine an initial location of the mobile device 138 when the mobile device 138 exits the vehicle 100. The boundary monitor 146 detects (a) when the mobile device 138 exits the vehicle 100, and (b) from which door 140 the mobile device 138 exited the vehicle 100. Based on which door 140 the mobile device 138 exited the vehicle 100 from, the mobile device 138 assigns a location 202 on the vehicle 100 associated with that door 140 as the initial location of the mobile device. The locations 202 may be, for example, the middle of the panel of the associated one of the doors 140.

When the vehicle 100 includes multiple internal wireless nodes 102 and external wireless nodes 104 (e.g., the vehicle 100 includes a phone-as-a-key system, or a Bluetooth® Key Fob, etc.), the boundary monitor 146 uses the signal strengths between the mobile device 138 and the wireless nodes 102 and 104 to determine (i) when the mobile device 138 exits the vehicle 100 (e.g., the mobile device 138 transitions from being internal to the vehicle 100 to external to the vehicle 100), and (ii) which side (e.g., driver's side, passenger's side, rear, etc.) of the vehicle 100 at which the mobile device 138 exited. To determine through which door 140 a mobile device 138 exited, the boundary monitor 146 uses the measurements from the occupant detection sensors 106, 108, and 110 associated with the seats on the side of the vehicle 100 determined via the signal strength analysis. For example, when the mobile device 138 exits the vehicle 100 and the door angle sensor 110 detects the front driver's side door open to an angle sufficient for egress, the boundary monitor 146 may determine that the that the mobile device 138 exited via the front driver's side door.

In some scenarios, multiple doors 140 may open at nearly the same time. In such examples, the boundary monitor 146 uses measurements from multiple occupant detection sensors 106, 108, and 110 to determine which door to associate with the mobile device 138. For example, if a door 140 opens but the measurement from the corresponding weight sensor 106 indicates that the corresponding seat is empty, the boundary monitor 146 may illuminate that door 140 as the door 140 through which the mobile device 138 exited. Alternatively or additionally, when the boundary monitor 146 detects the presence of multiple mobile devices paired with the vehicle 100, the boundary monitor 146 uses timing of events associated with the occupant detection sensors 106, 108, and 110 to assign a door to each mobile device.

Alternatively, in some examples, the vehicle 100 either does not include the internal antenna(s) 102 and/or multiple external antennas 104 to distinguish which side of the vehicle 100 through which the mobile device 138 exited. In such examples, the boundary monitor 146 receives, via one of the wireless nodes 102 and 104, initial data from inertial sensors 204 (e.g., gyroscopes, accelerometers, etc.) of the mobile device 138. The boundary monitor 146 determines which side of the vehicle 100 through which the mobile device 138 exited based on the inertial data. For example, the inertial data may indicate that the mobile device 138 moved towards the driver's side of the vehicle 100 just before the rear driver's side door opened. In such an example, the boundary monitor 146 may determine that the mobile device 138 exited the vehicle 100 at the rear driver's side door.

In some examples, when multiple mobile devices are present in the vehicle 100, while the vehicle 100 is in motion, the boundary monitor 146 assigns each mobile device a seat in the vehicle 100 based on differences in angular acceleration when the vehicle 100 turns. Examples of assigned seats to the mobile devices are described in U.S. Pat. No. 9,467,817, entitled "Determining Vehicle Occupant Location," granted on Oct. 11, 2016, which is herein incorporated by reference in its entirety. Thus, when the mobile devices 138 is assigned to a seat, the boundary monitor 146 assigns the corresponding location 202 on the body of the vehicle 100 when that mobile device 138 exits the vehicle 100.

Figure 3:
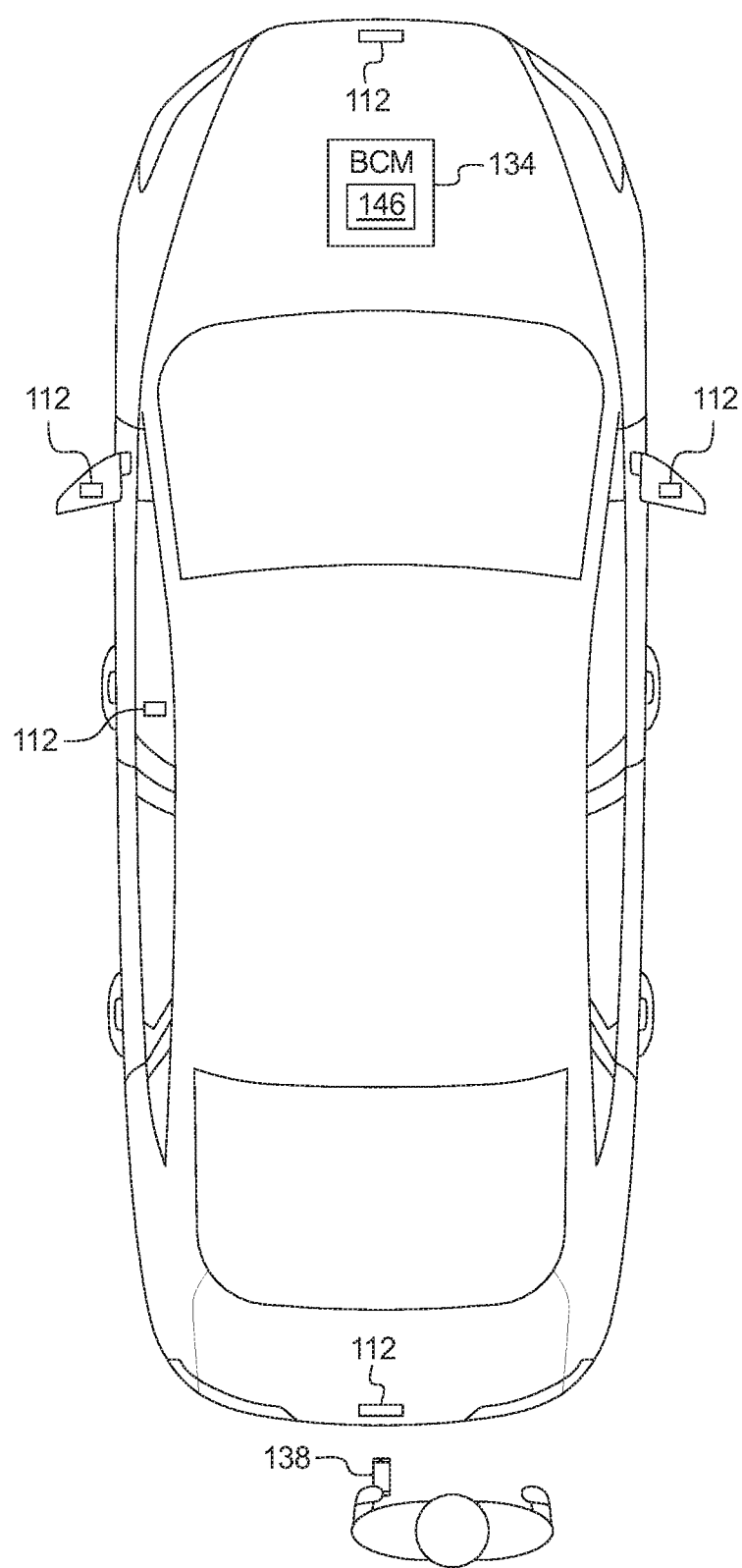
FIG. 3 illustrates the vehicle of FIG. 1 configured to determine an initial location of a mobile device using proximity based sensors.
Figure 4A:
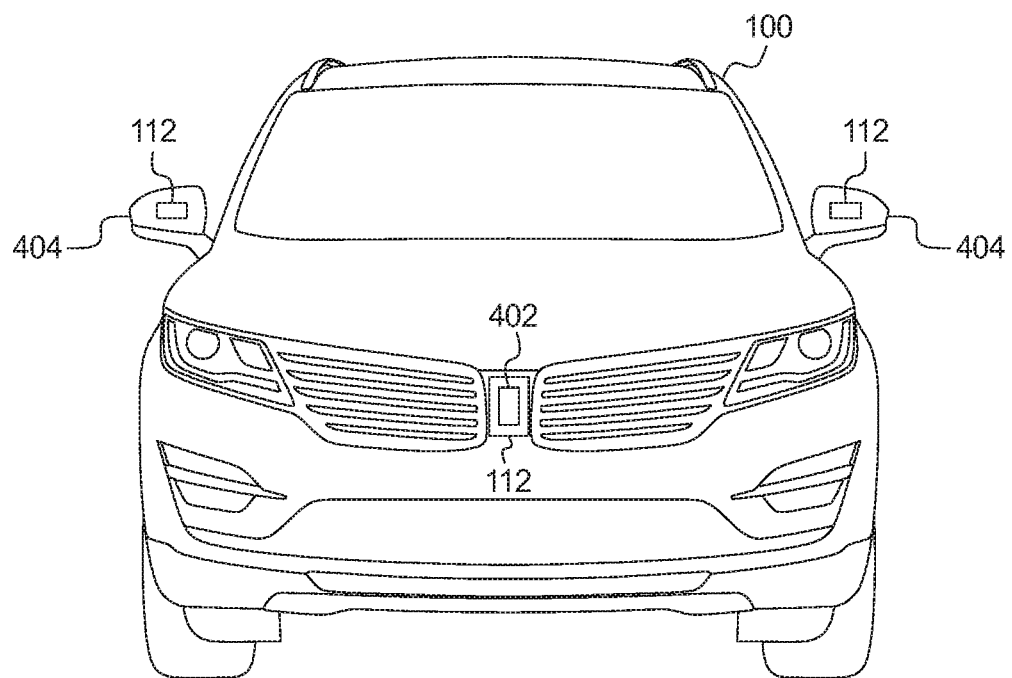
FIGS. 4A and 4B illustrate the vehicle of FIG. 1 with proximity based sensors.
Figure 4B:
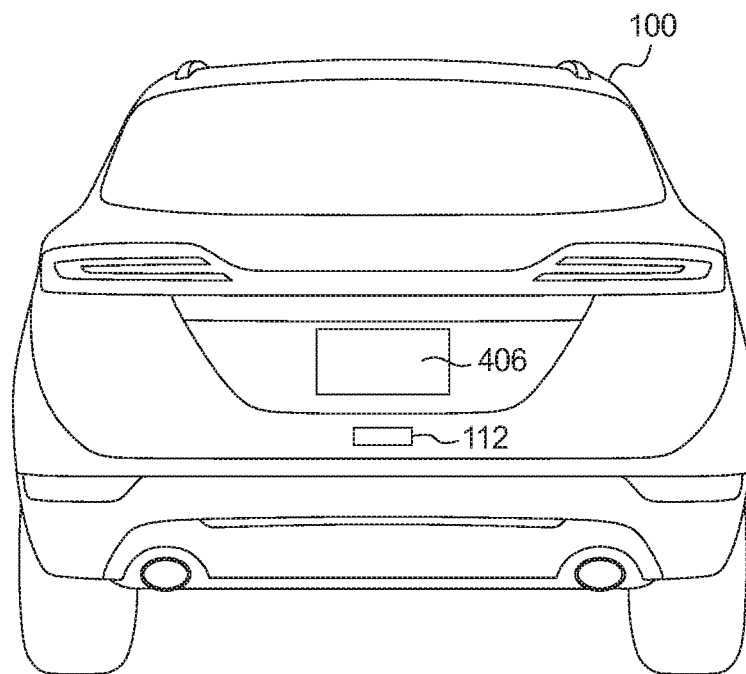

FIG. 3 illustrates the vehicle of FIG. 1 configured to determine an initial location of a mobile device 138 using proximity sensors 112. When the mobile device 138 is in the vicinity of the vehicle 100 (e.g., as determined though GPS coordinates and/or localization, etc.) and a new initial location of the mobile device is required (e.g., because the time and/or distance traveled since the last determination exceeds a threshold, etc.), the boundary monitor 146 sends a message to a corresponding application executing on the mobile device 138 that causes the mobile device 138 to instruct the operator to place the mobile device 138 within range of one of the proximity sensors 112. The proximity sensors 112 represent a fixed reference point on the vehicle 100. The proximity sensors are located on areas that are accessible to the operator when the vehicle is parked in a narrow parking spot. In the illustrated example of FIG. 4A, one of the proximity sensors 112 is located behind or integrated with a vehicle badge 402. Additionally, in some examples, some of the proximity sensors 112 are located on the housing of side view mirrors 404 and/or one or more door handles of the vehicle 100. In the illustrated example of FIG. 4B, one of the proximity sensors 112 is located below a license plate area 406 of the vehicle 100. Alternatively or additionally, in some examples, the proximity sensors 112 are integrated into the keyless entry keypad (e.g., located proximate to the B-pillar on the driver's side front door of the vehicle 100, etc.).

In some examples, the RePA application on the mobile device 138 displays the location of the proximity sensors on an interface. In some examples, the active safety module 136 activates the RePA system upon detection of the authorized mobile device 138 proximate to one of the proximity sensors 112. In such examples, in response to bringing the mobile device within range of the proximity sensors, the active safety module 136 (a) sends a message to automatically start a corresponding RePA application on the mobile device 138, (b) unlocks the corresponding RePA application on the mobile device 138 (e.g., in a system where acknowledgement from the active safety module 136 of the vehicle 100 is required to enable RePA functionality in the application executing on the mobile device 138), (c) automatically presents the operator with a user default RePA state, (d) causes the corresponding RePA application on the mobile device 138 to present the operator with available parking maneuver options, and/or (d) automatically starts the engine of the vehicle 100 (e.g., via the powertrain control module 132, etc.).

In some examples, items of infrastructure (e.g., parking meters, fire hydrants, light poles, etc.) may include infrastructure proximity sensors. The boundary monitor 146 determines the relative location of the item of infrastructure with reference to the vehicle 100 (e.g., via image analysis as discussed in connection with FIG. 5 below, etc.). In some such examples, the boundary monitor 146 establishes communication (e.g., via the on-board communication module 130) with the item of infrastructure. In such examples, the item of infrastructure sends a message when the user brings the mobile device 138 in proximity of the proximity sensors of the item of infrastructure. For example, a parking meter may include an NFC contactless payment system that, when processing payment via the mobile device 138, sends a message via DSRC or WLAN to the vehicle 100 using information (e.g., vehicle identifier, temporary password to access the WLAN, etc.) in a user profile associated with a payment account and/or transmitted by the mobile device 138. In such examples, the boundary monitor 146 determines the relative location of the mobile device 138 by determining the relative location of the parking meter via image analysis or by determining which parking space the vehicle 100 is parked in and receiving a distance, from the parking meter, between the parking space and the parking meter.

Figure 5:
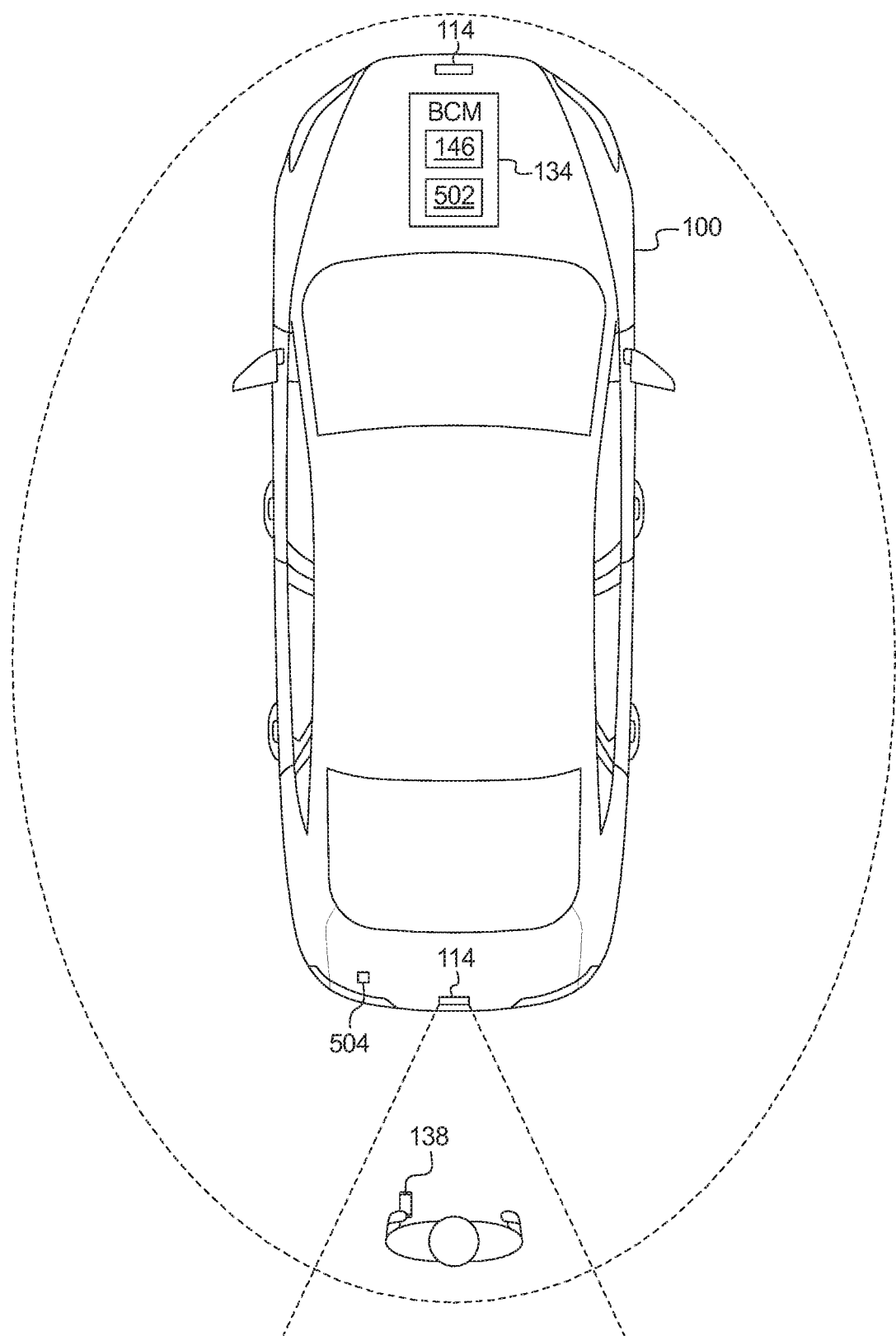
FIG. 5 illustrates the vehicle of FIG. 1 configured to determine an initial location of the mobile device using image recognition.
Figure 6:
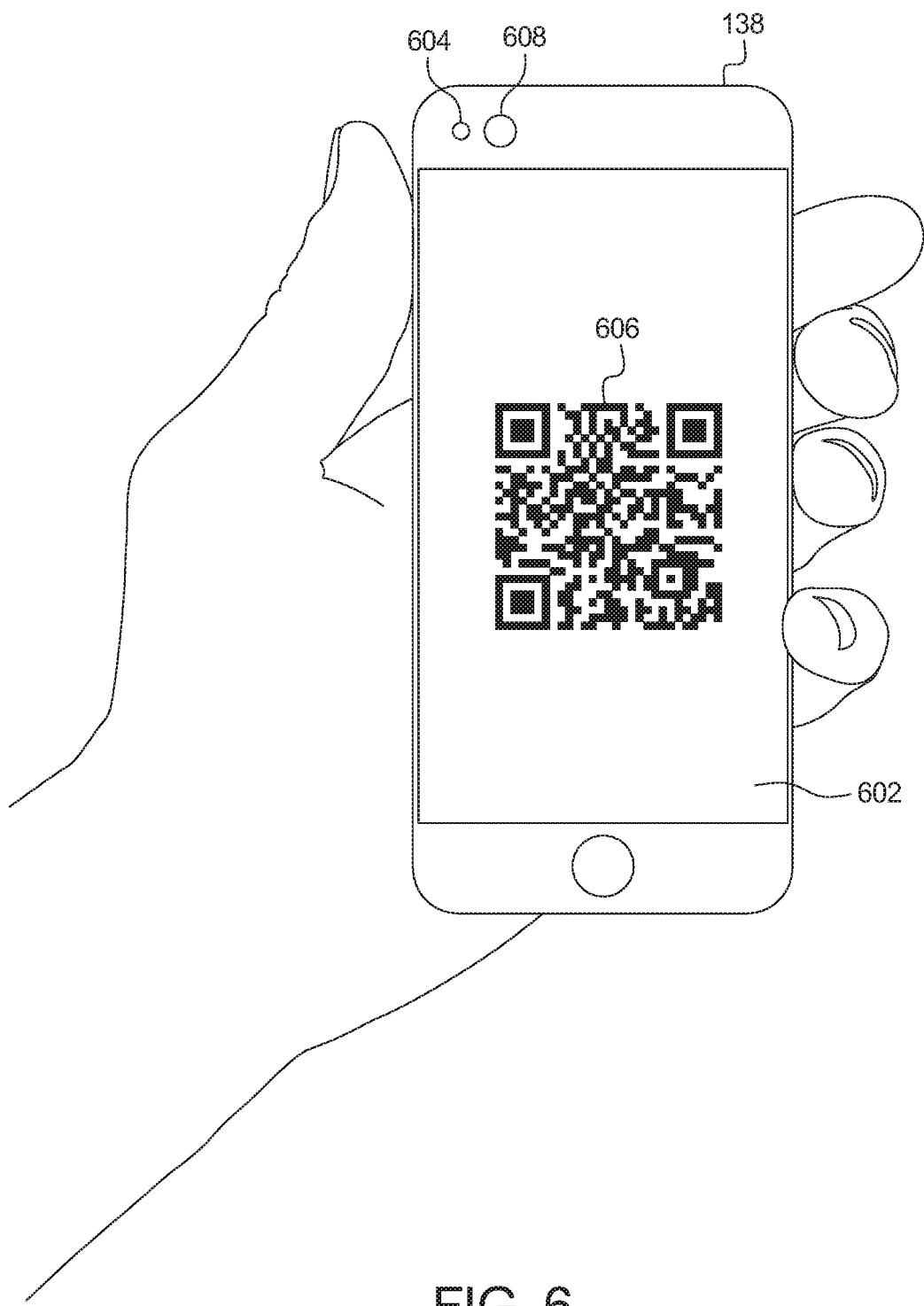
FIG. 6 illustrates a mobile device.

FIG. 5 illustrates the vehicle 100 of FIG. 1 configured to determine an initial location of the mobile device 138 using image recognition. FIG. 6 illustrates the mobile device executing a RePA application 602 that is in communication with the boundary monitor 146. The boundary monitor 146 communicatively couples with the mobile device 138 and instructs the operator to perform a specific action via the corresponding RePA application 602 executing on the mobile device 138. In some examples, the boundary monitor 146 instructs the operator to hold the mobile device 138 perpendicular to the longitudinal axis of the vehicle 100 in view of one of the cameras 114. The boundary monitor 146 takes an image of the mobile device 138. In some such examples, the body control module 134 includes a database of mobile device specifications 502 in memory (e.g., the memory 1306 of FIG. 13 below) that contains specifications (e.g., height, width, location and size of front and/or rear cameras, etc.) of mobile devices associated (e.g., paired, etc.) with the vehicle 100. For example, the database 502 may include a record for the mobile device 138 that indicates that the mobile device 138 is 17.75 cm×7.62 cm (6.2 inches×3 inches). From time-to-time, in such examples, the boundary monitor 146 manages (e.g., receives updates from an external network, removes old or out-of-date records, etc.) the database of mobile device specifications 502. Using the database of mobile device specifications 502 and/or specifications provided when the corresponding RePA application is installed on the mobile device 138, the boundary monitor 146 determines the relative location of the mobile device 138 based on the scale difference between the dimensional measurements of the mobile device 138 in the captured image and the reference dimensional measurements in the database of mobile device specifications 502. In some examples, the boundary monitor 146 uses dimensions of a particular feature 604 (such as a screen size, a mobile device camera size, etc.) In some examples, the RePA application executing on the mobile device 138 displays an image 606 of known dimensions (such as a logo or a Quick Response (QR) code, etc.). In such examples, the boundary monitor 146 compares the dimensions of the image 606 in the captured image to the expected dimensions of the image 606 based on a size and/or resolution of the screen of the mobile device 138.

In some examples, the boundary monitor 146 instructs the user to capture an image of a certain feature of the vehicle (e.g., a license plate frame, a sicker affixed the vehicle, etc.) with the mobile device 138. In such examples, the boundary monitor 146 determines the relative location of the mobile device 138 based on differences in dimensional measurements of the feature in the captured image and reference dimensional measurements of the feature. For example, the vehicle 100 may have a graphical feature 504 (e.g., as a sticker, as part of a paint pattern, etc.) on the front and/or rear of the vehicle 100. In some examples, the graphical feature 504 is a code (e.g., a QR code, a bar code, etc.) that is composed on an ultraviolet (UV) material that is only visible under UV light. In such examples, the vehicle 100 includes an UV light that, when illuminated, causes the UV graphical feature 504 to become visible.

In some examples, the boundary monitor 146 instructs the operator to point a flash 608 of the mobile device 138 at the camera 114 of the vehicle 100. In some such examples, the boundary monitor 146 communicates with the mobile device 138 using a form of visible light communication, such as Li-Fi. In some such example, the boundary monitor 146 determines the distance to the mobile device 138 based on a measured light intensity of the flash 608 compared to an expected light intensity. In some such examples, the RePA application 602 communicates the expected light intensity of the flash 608 to the boundary monitor 146. In some examples, the mobile device 138 repeats a pattern of different predetermined light intensities of the flash 608. The predetermined light intensities are light intensities that both the boundary monitor 146 and the RePA application 602 are configured to expect. In such examples, the boundary monitor 146 determines the distance between the vehicle 100 and the mobile device 138 by analyzing the difference between the captured light intensities and the predetermined light intensities. For example, the mobile device may step-wise increase the brightness of its flash 608 from 0% to 100% in a timeframe established between the mobile device 138 and the boundary monitor 146.

In some examples, the boundary monitor 146 uses multiple techniques discussed above in connection to FIGS. 5 and 6 to determine the relative location of the mobile device 138 to the vehicle 100. In some such examples, the distance estimates are combined (e.g., averaged, weighted averaged, etc.). For example, the boundary monitor 146 may capture an image of the mobile device 138 and receive an image captured by the mobile device 138. In such an example, the boundary monitor 146 may calculate a first estimate based on the image captured by the camera 114 of the vehicle 100 and calculate a second estimate based on the image received from the mobile device 138. In such an example, the boundary monitor 146 may average the first and second estimates to determine the distance between the mobile device 138 and the vehicle 100.

Figure 7:
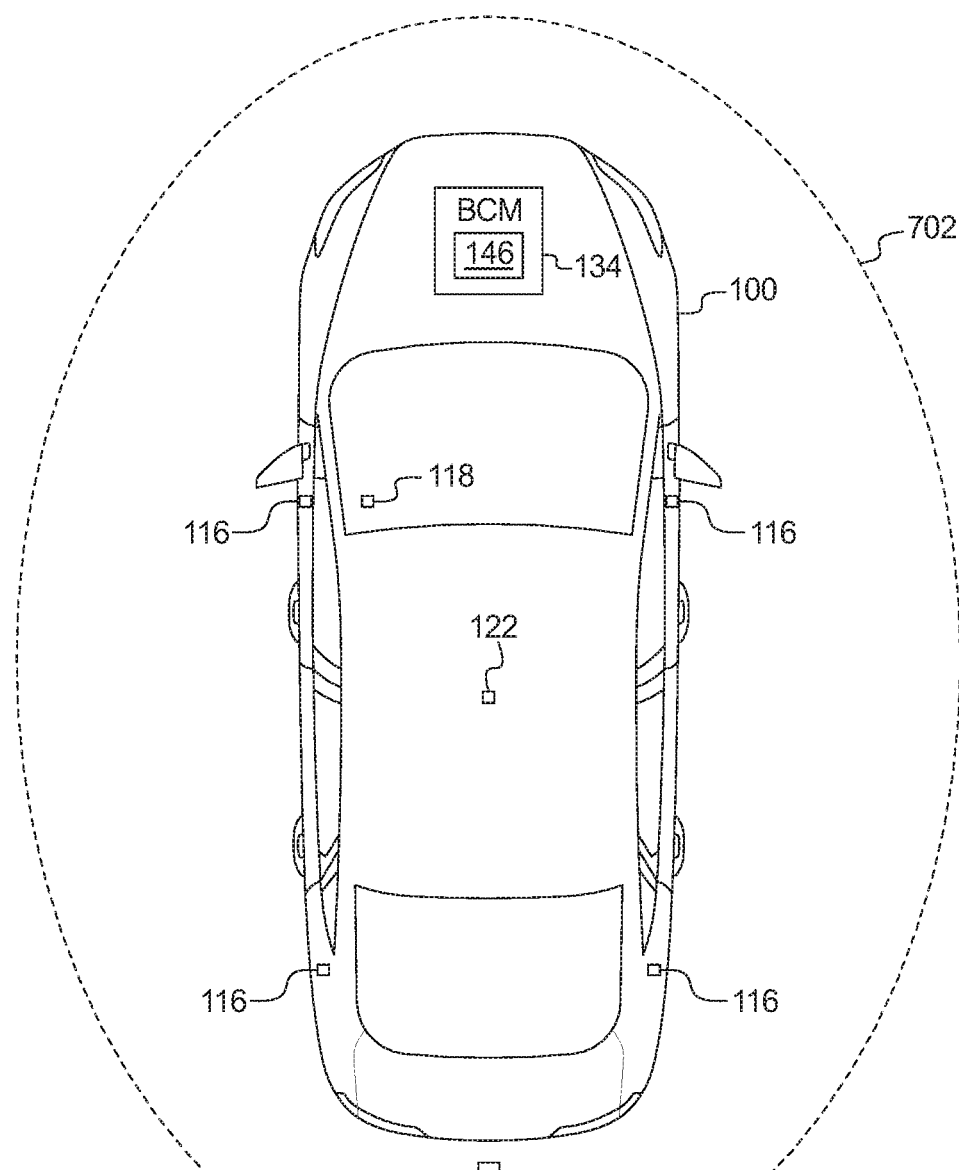
FIG. 7 illustrates the vehicle of FIG. 1 configured to determine when the mobile device is within range of the vehicle using trajectory data.
Figure 7:
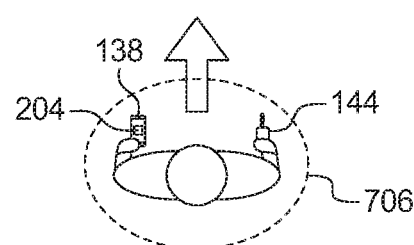

FIG. 7 illustrates the vehicle 100 of FIG. 1 configured to determine when the mobile device 138 is within range of the vehicle 100 (e.g., is within the boundary 702) using trajectory data. The boundary monitor 146 uses the mobile device 138 and a key fob 144 to determine the location of the mobile device 138 relative to the location of the vehicle 100. Generally, the key fob 144 communicates with the vehicle 100 at a lower frequency (e.g., 315 MHz to 902 MHz) than the mobile device 138 (e.g., 2.4 GHz). Additionally, the key fob polling signal is a low frequency signal (e.g., 125 kHz, etc.). As such, localization techniques using the key fob 144 signal strength are generally more accurate than the localization using the signal strength of the mobile device 138. Because the key fob 144 has a limited battery, the boundary monitor 146 conserves power use of the key fob 144 by disabling and/or changing the intervals between polling signals and instead uses polling from the mobile device 138 when the increased accuracy of the polling signal from the key fob 144 is not necessary. The boundary monitor 146 uses the trajectory of the mobile device 138 and the trajectory of the vehicle 100 to determine when to use the key fob 144 polling signal and which polling interval to use.

The boundary monitor 146 determines the trajectory (e.g., the speed and the direction) of the vehicle 100 based on measurement from one or more of the trajectory sensors 116, 118, and 122. The RePA application 602 on the mobile device 138 sends measurements from the inertial sensors 204 to the boundary monitor 146. The boundary monitor 146 determines the trajectory of the mobile device 138 based on measurements received from the mobile device 138. The boundary monitor 146 determine whether the location of the vehicle 100 and the location of the mobile device 138 are converging (e.g., getting closer) or diverging (e.g., getting farther away). Using localization techniques, the boundary monitor 146 determines a region of probability 706 for the operator. The region of probability 706 represents an area that contains the location of the operator taking into account the localization error of triangulation or trilateration via signal strengths of the mobile device 138 and/or the key fob 144. For example, the region of probability 706 may be defined by a point 7 meters from the vehicle (estimated with the localization technique) with a 0.25 meter radius of error. Using signal strength measurements from the key fob 144 makes the region of probability 706 smaller compared to using signal strength measurements from the mobile device 138.

The boundary 702 is defined by the threshold distance between the vehicle 100 and the mobile device 138 at which the RePA system is to operate. For example, the boundary 702 may be 6 meters from each point on the outer surface of the vehicle 100. When the region of probability 706 is entirely within the boundary 702 and the distance between the vehicle 100 and the mobile device 138 is decreasing, the boundary monitor 146 decreases or suspends the interval of polling the key fob 144. In such a scenario, because the location of the mobile device 138 and the vehicle 100 are converging within the boundary 702, the mobile device 138 will not exit the boundary 702 and thus precisely tracking the location of the mobile device 138 is less important. When the region of probability 706 is within the boundary 702 and the distance between the vehicle 100 and the mobile device 138 is increasing, the boundary monitor 146 resumes the key fob polling if it has been suspended and increases the polling interval as the vehicle 100 moves further away from the mobile device 138. In such a manner, the boundary monitor 146 more quickly detects if the mobile device 138 moves out of range.

In some examples, the boundary monitor 146 changes the polling interval for the key fob 144 as a function of relative velocity of the vehicle 100 with reference to the mobile device 138. For example, the boundary monitor 146 may increase the polling interval to be greater the faster the relative velocity of the vehicle 100 is with reference to the mobile device 138. In such an example, the polling interval is increased because the mobile device 138 may leave the boundary 702 quicker when the relative velocity of the vehicle 100 with reference to the mobile device 138 is faster, and, thus increasing frequency of estimating the location of the mobile device 138 facilitates more quickly determining when the mobile device 138 crosses the boundary 702.

Figure 8A:
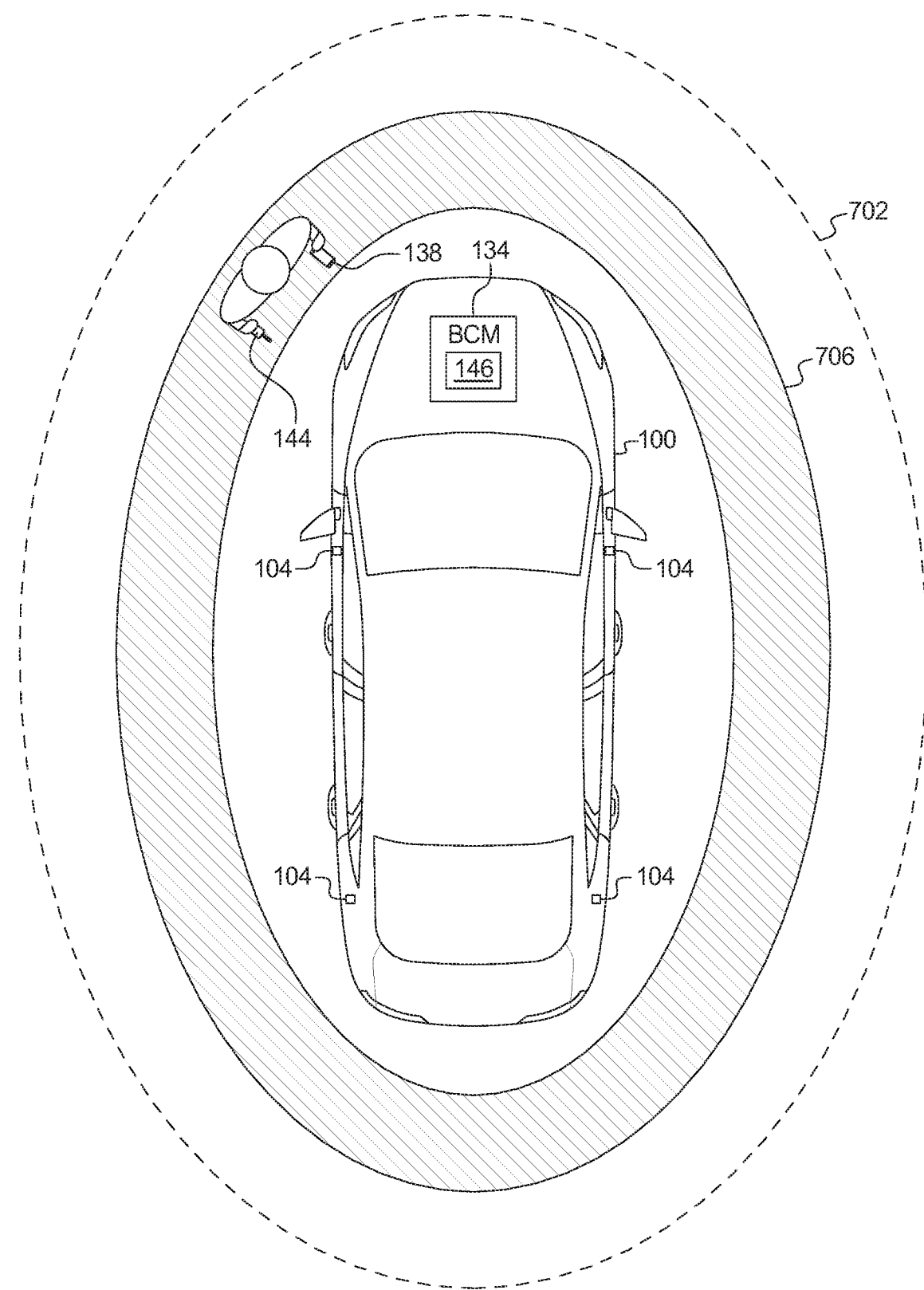
FIGS. 8A, 8B, and 8C illustrate the vehicle of FIG. 1 configured to determine when the mobile device is with range of the vehicle using regions of probability.
Figure 8B:
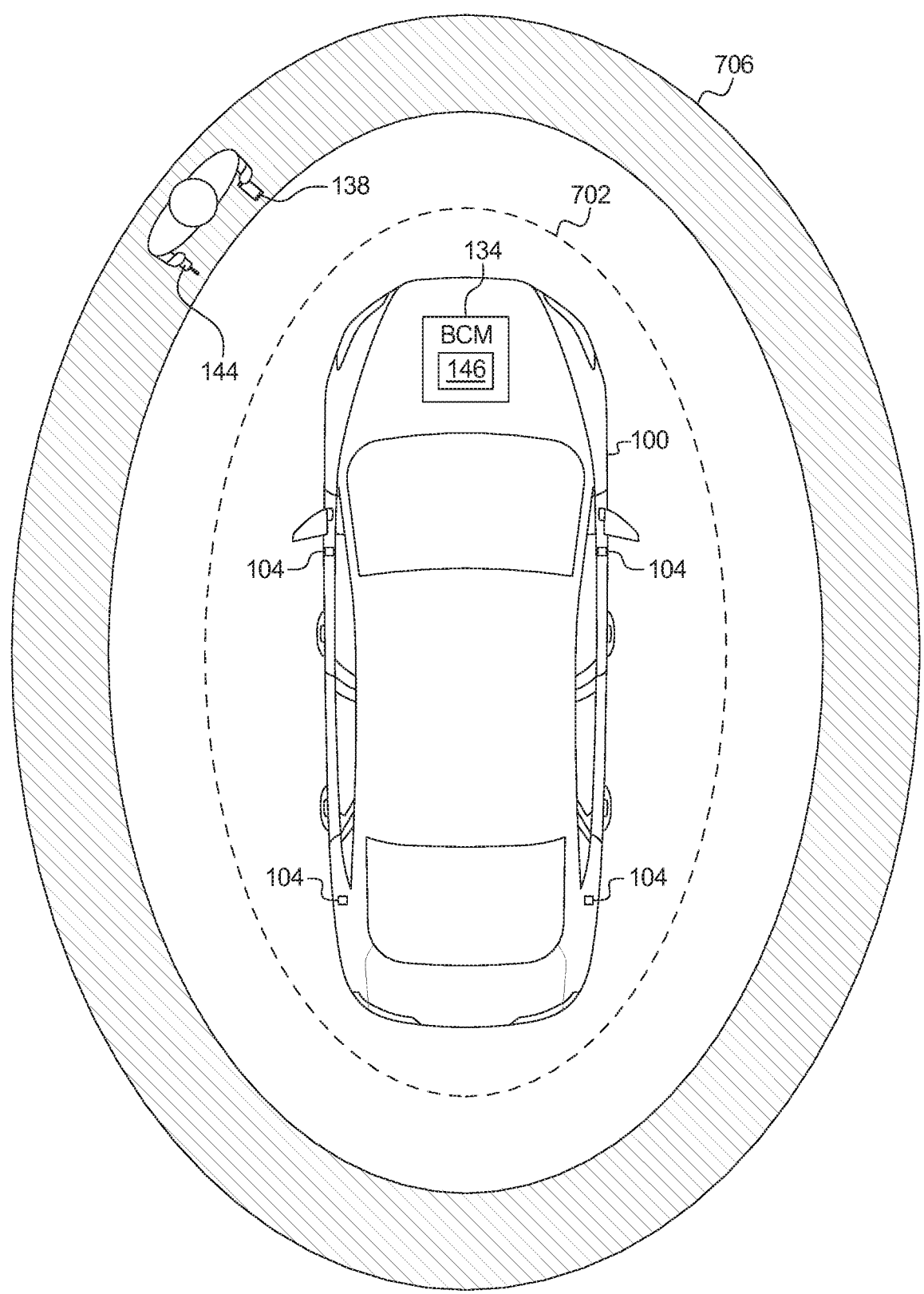
Figure 8C:
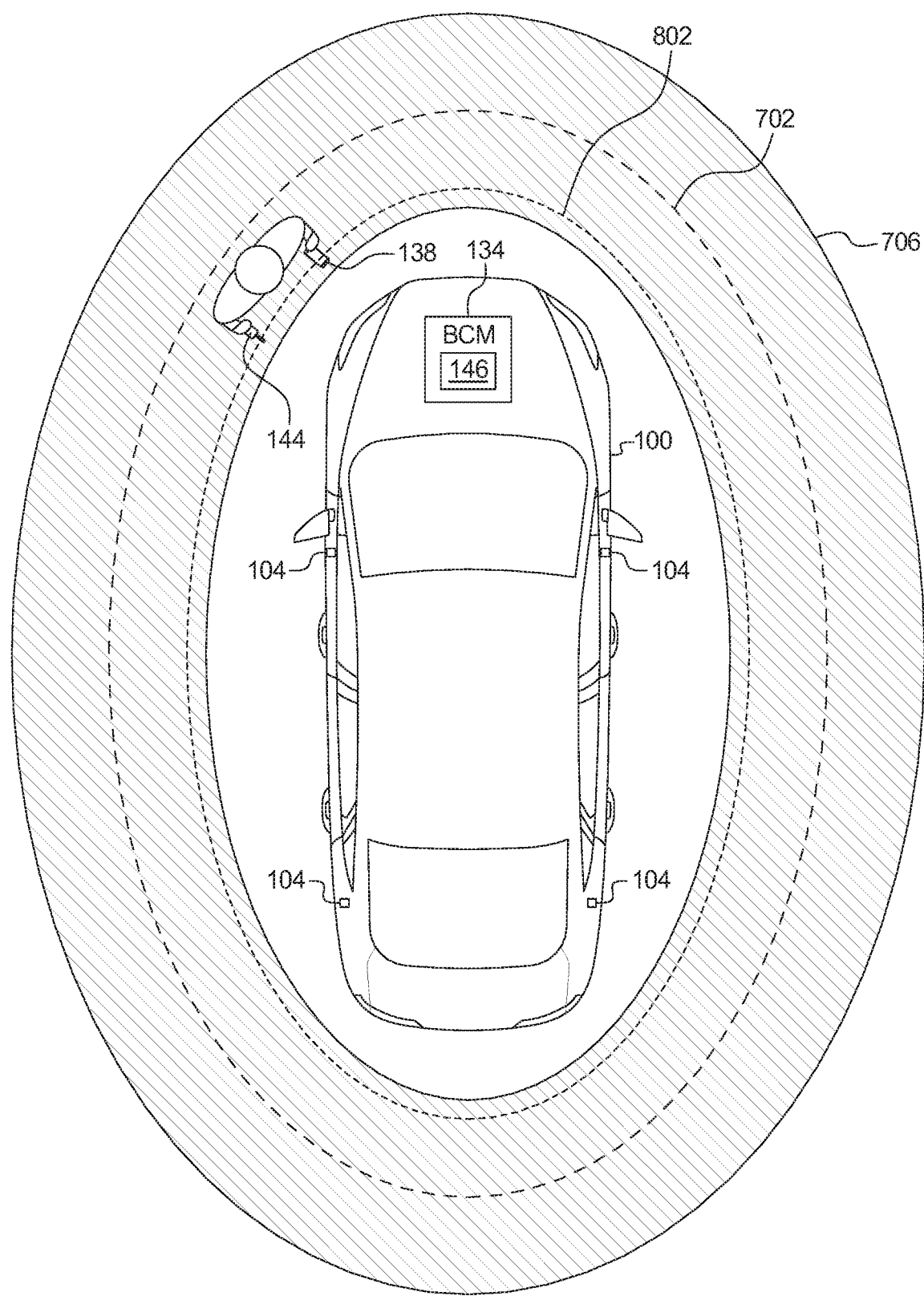

FIGS. 8A, 8B, and 8C illustrate the vehicle 100 of FIG. 1 configured to determine when the mobile device 138 is within range of the vehicle 100 (e.g., within the boundary 702) using region of probability 706. The boundary monitor 146 tracks the regions of probability 706 of the location of the mobile device 138 using localization techniques on the mobile device 138 and the key fob 144. In the illustrated example of FIGS. 8A, 8B, and 8C, the vehicle 100 may only include one external wireless node 104 and, as a consequence, the boundary monitor 146 tracks a distance that the mobile device 138 and/or key fob 144 is from the vehicle 100. In such examples, the region of probability 706 encompasses a ring around the vehicle 100. Initially, the polling of the key fob 144 is deactivated to conserve the battery life of the key fob 144.

The boundary monitor 146 compares the region of probability 706 to the boundary 702. The boundary monitor 146 calculates the region of probability 706 using signals from the mobile device 138. Generally, the region of probability 706 encompasses a larger band of area the farther the mobile device 138 is from the vehicle 100. The boundary monitor 146 reacts depending on the relationship between the region of probability 706 to the boundary 702. FIG. 8A illustrates the region of probability 706 entirely inside of the boundary 702. When the region of probability 706 is entirely inside of the boundary 702, the boundary monitor 146 determines that the mobile device 138 is inside of the boundary 702 without instructing the key fob 144 to begin sending its signal strength measurement of the polling signals. FIG. 8B illustrates the region of probability 706 entirely outside of the boundary 702. When the region of probability 706 is entirely outside of the boundary 702, the boundary monitor 146 determines that the mobile device 138 is outside of the boundary 702 without initiating the key fob 144 polling or instructing the key fob 144 to begin assessing a polling signal.

FIG. 8C illustrates the boundary 702 within the region of probability 706. When the boundary 702 is within the region of probability 706, the boundary monitor 146 instructs the key fob 144 to send its signal strength measurement of the polling signals. The boundary monitor 146 determines a location 802 (or a radius of locations) for the key fob 144. When the location 802 is within the boundary 702, the boundary monitor 146 determines that the mobile device 138 is inside of the boundary 702. When the location 802 is not within the boundary 702, the boundary monitor 146 determines that the mobile device 138 is outside of the boundary 702. The boundary monitor 146 continues to monitor the region of probability 706. When the region of probability 706 is entirely outside of the boundary 702, the boundary monitor 146 stops polling the keyfob and/or instructs the key fob 144 to stop assessing polling signals. Additionally, when the region of probability 706 is entirely inside of the boundary 702, the boundary monitor 146 stops polling the key fob 144 or instructs the key fob 144 to stop assessing the polling signal.

Figure 9:
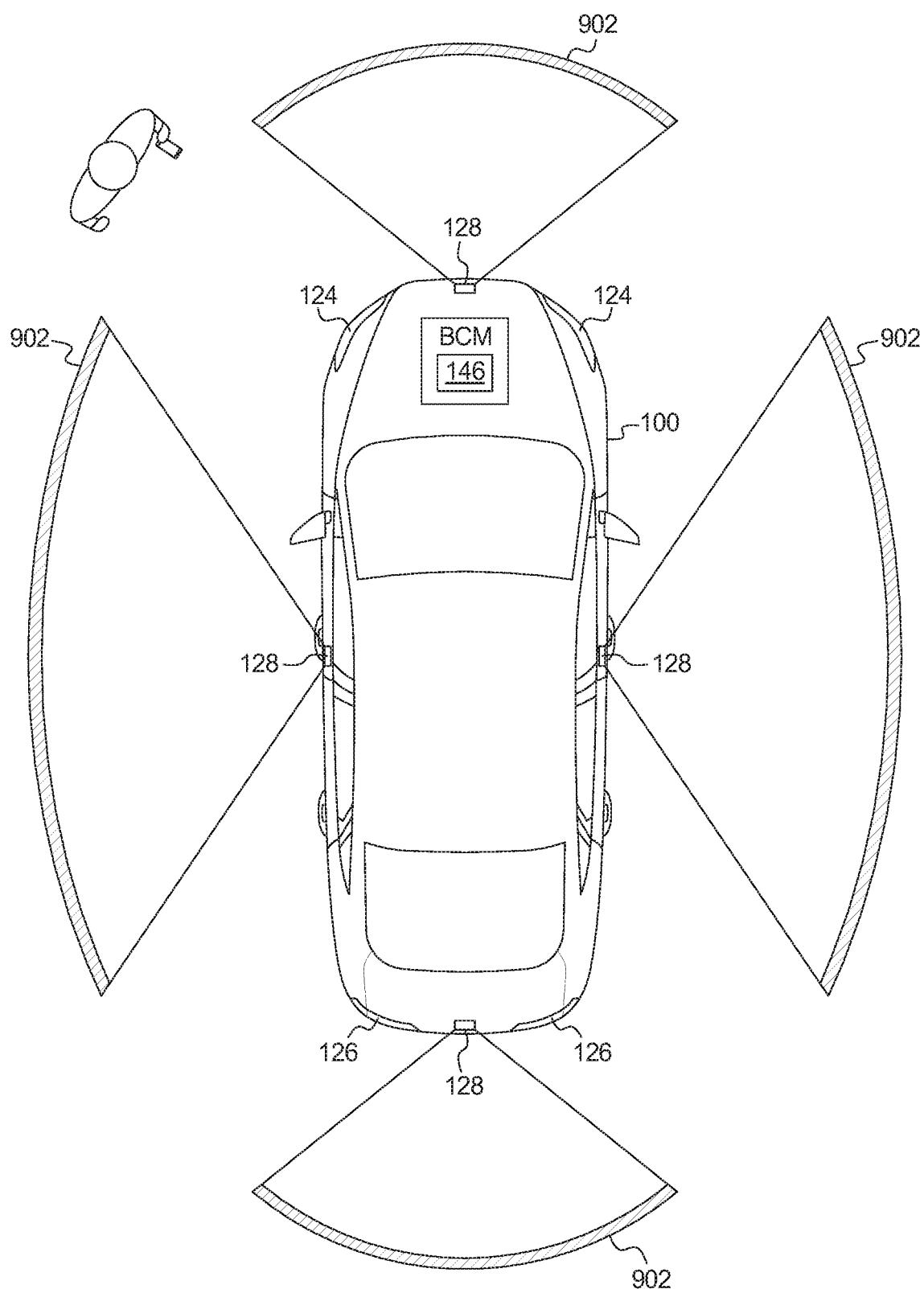
FIG. 9 illustrates the vehicle of FIG. 1 configured to visually indicate when the mobile device is within range of the vehicle.

FIG. 9 illustrates the vehicle 100 of FIG. 1 configured to visually indicate when the mobile device 138 is within range of the vehicle 100. The boundary monitor 146 determines the relative locations of the mobile device 138 to the vehicle 100 and signals using the lights 124 and 126 and/or the projector lamps 128 of the vehicle 100. The boundary monitor 146 provides a different visual indication based on (a) the relative locations of the mobile device 138 to the vehicle 100, (b) the motion of the vehicle 100, and/or (c) the state of the RePA system, etc. The boundary monitor 146 provides the different visual indications when (i) the RePA system is active but the mobile device 138 is not detected by the boundary monitor 146, (ii) the RePA system is active and the mobile device 138 is outside the boundary 702, (iii) the RePA system is active, the mobile device 138 is inside the boundary 702, and the vehicle 100 is in motion, (iv) the RePA system is active, the mobile device 138 is inside the boundary 702, and the vehicle 100 is stationary, and (v) the RePA system is active and the mobile device 138 is inside the boundary 702 but near the edge of the boundary 702 (e.g., within 0.5 meters of the boundary 702, etc.).

In the illustrated example of FIG. 9, the boundary monitor 146 controls the projector lamps 128 to project a representation 902 of the boundary 702. The projector lamps 128 are configured to project the representation 902 substantially proximate to the location of the boundary 702. The boundary monitor 146 varies different aspects of the lights 124 and 126 and/or the projector lamps 128 to change the visual indicators presented by the vehicle 100. In some examples, the boundary monitor 146 varies the interior and/or exterior lights. In some examples, the boundary monitor 146 varies colors of the lights 124 and 126 and/or the representation 902 of the boundary 702 projected by the projector lamps 128. For example, the boundary monitor 146 may cause the lights 124 and 126 and/or the projector lamps 128 to have a green tint that fades into a yellow tint and eventually into a red tint as the relative distance between the vehicle 100 and mobile device 138 increases to be within the boundary 702, near the interior of the boundary 702, and outside the boundary 702 respectively. In some examples, the boundary monitor 146 causes the lights 124 and 126 and/or the projector lamps 128 to vary in brightness. For example, the boundary monitor 146 causes the lights 124 and 126 and/or the projector lamp 128 to be at 100% intensity when the mobile device 138 is next to the vehicle 100 and fade to 0% as the mobile device 138 crosses the boundary 702 to the outside of the boundary 702. In some examples, the boundary monitor 146 causes the representation 902 to be animated based on the location of the mobile device 138 with respect to the location of the vehicle 100. For example, the representation 902 may blink and/or spin with a speed that is proportional to the distance between the mobile device 138 and the vehicle 100.

As an example, when the RePA system is activated but the mobile device 138 is not detected by the boundary monitor 146, the boundary monitor 146 may cause the lights 124 and 126 and/or the projector lamp 128 to have a blinking red tint. As another example, when the RePA system is activated and the mobile device 138 is outside the boundary 702, the boundary monitor 146 may cause the lights 124 and 126 and/or the projector lamp 128 to have a solid red tint. As another example, when the RePA system is activated, the mobile device 138 is inside the boundary 702, and the vehicle 100 is in motion, the boundary monitor 146 may cause the lights 124 and 126 and/or the projector lamp 128 to have a blinking green tint. As another example, when the RePA system is activated, the mobile device 138 is inside the boundary 702, and the vehicle 100 is stationary, the boundary monitor 146 may cause the lights 124 and 126 and/or the projector lamp 128 to have a solid green tint. As another example, when the RePA system is activated and the mobile device 138 is inside the boundary 702 but near the edge of the boundary 702, the boundary monitor 146 may cause the lights 124 and 126 and/or the projector lamp 128 to have a yellow tint.

In some examples, when the mobile device 138 is within the boundary 702, the interior cabin lighting and the lights 124 and 126 are at full light output and the projector lamp 128 projects the representation 902 of the boundary 702 as a solid green line. In some such examples, when the mobile device 138 is within the boundary 702 and the vehicle 100 is in motion, the representation 902 of the boundary 702 is animated to indicate the direction of travel. For example, the representation 902 of the boundary 702 may be animated such as a dashed representation 902 of the boundary 702 where the dashes move in the direction the vehicle 100 is turning and/or moving. In some such examples, when the mobile device 138 is within the boundary 702 and near the edge of the boundary 702, the lights 124 and 126 flash in a pattern and the representation 902 of the boundary 702 is animated as a dashed line that fades in and out.

Figure 10A:
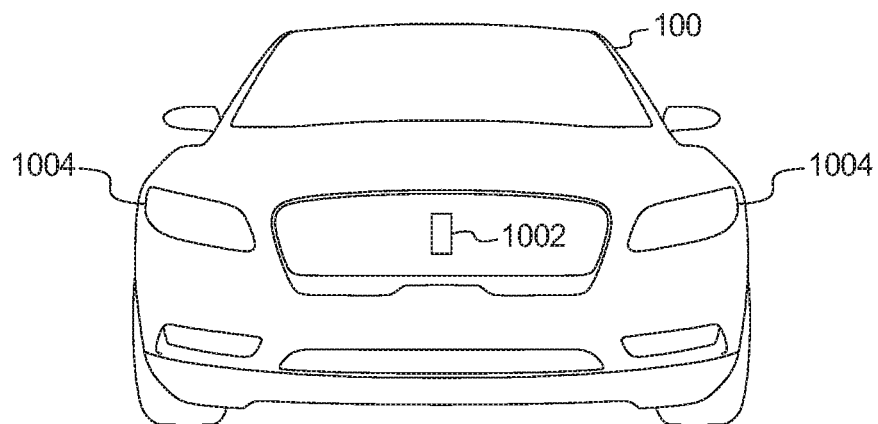
FIGS. 10A, 10B, and 10C illustrate an example front of the vehicle of FIG. 1 configured to visually indicate when the mobile device is within range of the vehicle.
Figure 10B:
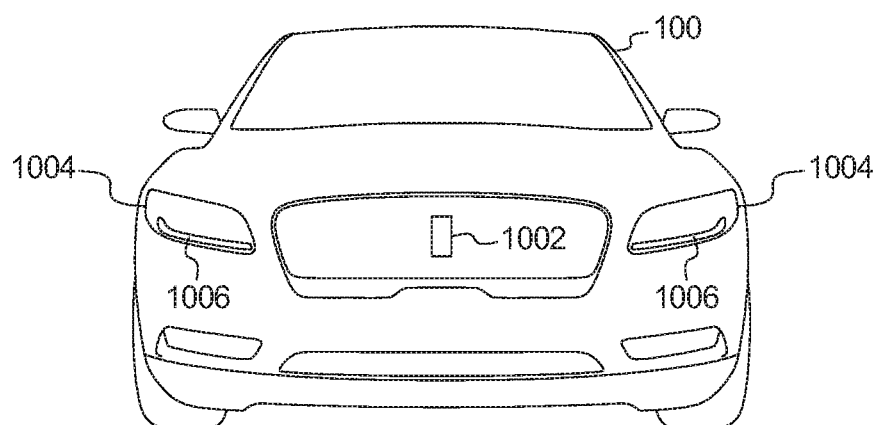
Figure 10C:
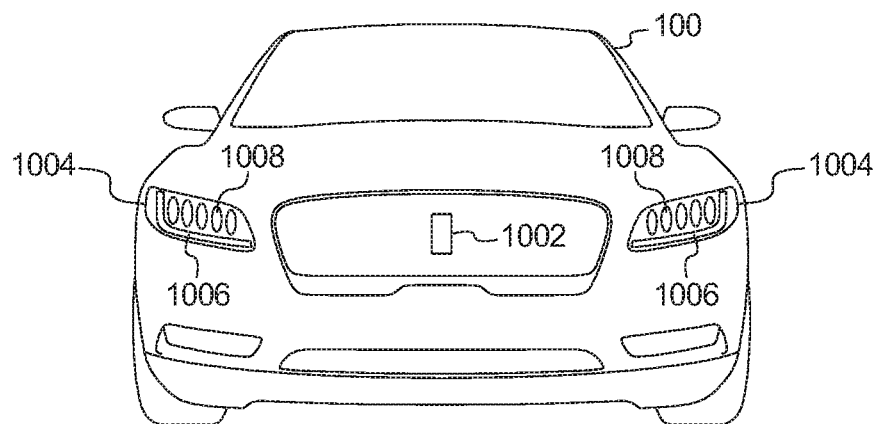

FIGS. 10A, 10B, and 10C illustrate a method to vary the lights 124 of the vehicle 100 based on the location of the mobile device 138 relative to the location of the vehicle 100. The example lights 124 include a back-lit badge 1002 and headlights 1004. The back-lit badge 1002 illuminates when a lamp or LED behind the back-lit badge 1002 illuminates. The headlights 1004 include an LED strip 1006 and main lights 1008. In the illustrated example, the LED strip 1006 runs along two sides of the main lights 1008. Alternatively, in some examples, the LED strip 1006 runs along three or four sides of the main lights 1008. For example, when the main lights 1008 are a circular assembly, the LED strip 1006 may encircle the main lights 1008. The back-lit badge 1002, the LED strip 1006, and the main lights 1008 are separately controllable. In some example, the LEDs of the LED strip 1006 are separately controllable so that LED strip 1006 is configurable to display different patterns of LEDs. The boundary monitor 146 controls the back-lit badge 1002, the LED strip 1006, and the main lights 1008 to provide the visual indicator to the operator.

In FIG. 10A, the back-lit badge 1002 is lit and the LED strip 1006 and the main lights 1008 are unlit. For example, the boundary monitor 146 may provide the visual indicator of FIG. 10A when the RePA system is activated and mobile device 138 is outside of the boundary 702. In FIG. 10B, the back-lit badge 1002 and the LED strip 1006 are lit and the main lights 1008 are unlit. For example, the boundary monitor 146 may provide the visual indicator of FIG. 10B when the RePA system is activated, mobile device 138 is inside of the boundary 702 near the edge of the boundary 702. In FIG. 10C, the back-lit badge 1002, the LED strip 1006, and the main lights 1008 are lit. For example, the boundary monitor 146 may provide the visual indicator of FIG. 10C when the RePA system is activated, mobile device 138 is inside of the boundary 702.

Figure 11A:
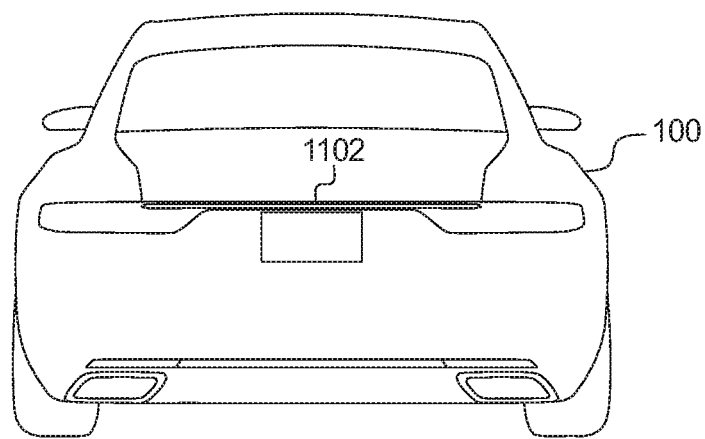
FIGS. 11A, 11B, and 11C illustrate an example rear of the vehicle of FIG. 1 configured to visually indicate when the mobile device is within range of the vehicle.
Figure 11B:
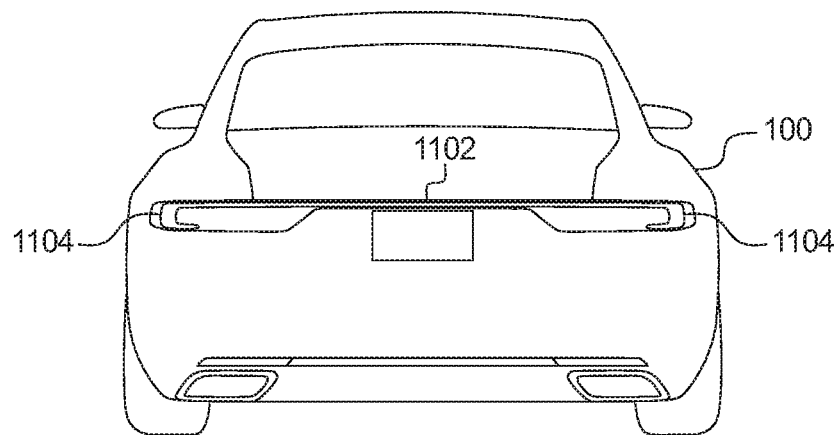
Figure 11C:
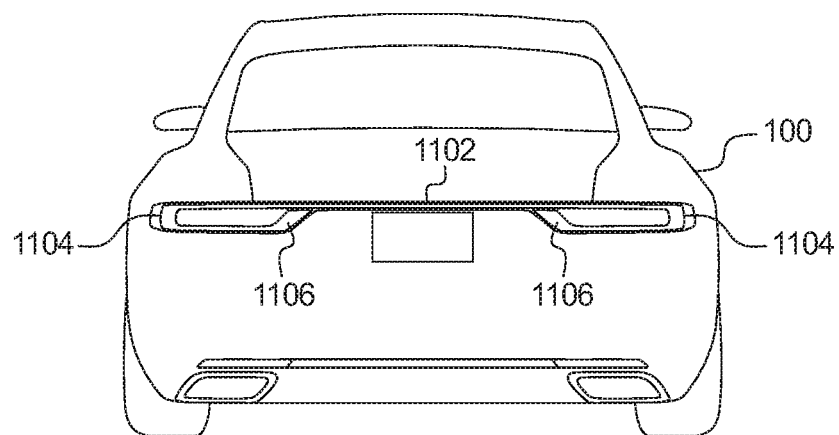

FIGS. 11A, 11B, and 11C illustrate a method to vary the lights 126 of the vehicle 100 based on the location of the mobile device 138 relative to the location of the vehicle 100. In the illustrated examples, the lights 126 include a light strip 1102 that runs across a length of the rear of the vehicle 100, a side light 1104, and a main taillight 1106. The light strip 1102, the side light 1104, and the main taillight 1106 are separately controllable. In some examples, the light strip 1102 includes separately controllable segments that can be configured to illuminate the light strip 1102 in different patterns.

In FIG. 11A, the light strip 1102 is lit and the side light 1104 and the main taillight 1106 are unlit. For example, the boundary monitor 146 may provide the visual indicator of FIG. 11A when the RePA system is activated and mobile device 138 is outside of the boundary 702. In FIG. 11B, the light strip 1102 and the side lights 1104 are lit and the main taillights 1106 are unlit. For example, the boundary monitor 146 may provide the visual indicator of FIG. 11B when the RePA system is activated, mobile device 138 is inside of the boundary 702 near the edge of the boundary 702. In FIG. 11C, the light strip 1102, the side lights 1104, and the main taillights 1106 are lit. For example, the boundary monitor 146 may provide the visual indicator of FIG. 11C when the RePA system is activated, mobile device 138 is inside of the boundary 702.

Figure 12A:
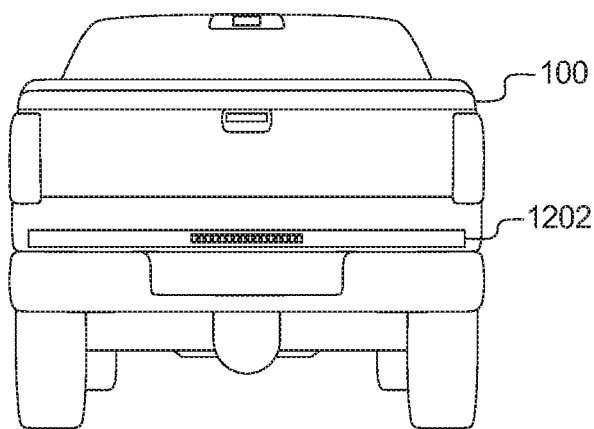
FIGS. 12A, 12B, and 12C illustrate another example rear of the vehicle of FIG. 1 configured to visually indicate when the mobile device is within range of the vehicle.
Figure 12B:
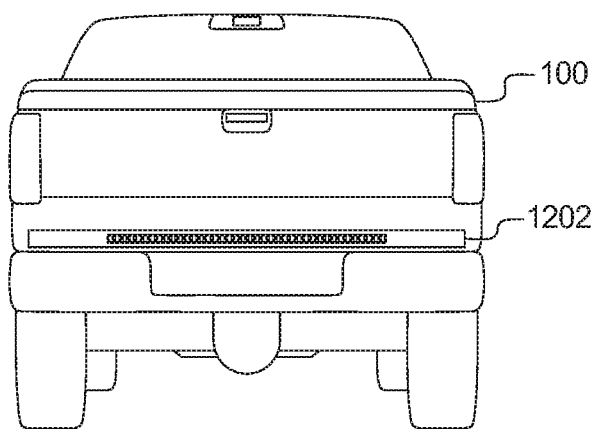
Figure 12C:
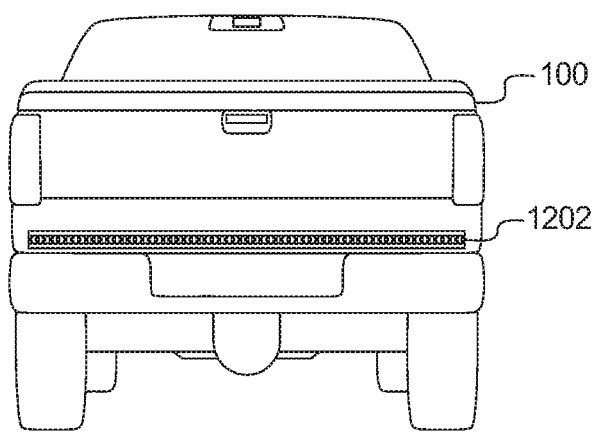

FIGS. 12A, 12B, and 12C illustrate the lights 126. In the illustrated examples, the lights 126 include an array of LEDs 1202. The array of LEDs 1202 may be embedded into a tailgate, a liftgate, or a trunk of the vehicle 100. Each element of the array of LEDs 1202 includes one or more LEDs. In some examples, the element of the array of LEDs 1202 include multi-color LEDs. Additionally, each element of the array of LEDs 1202 is individually controllable to facilitate different patterns being displayed based on the location of the mobile device 138 relative to the location of the vehicle 100.

In FIG. 12A, a portion of the array of LEDs 1202 is lit. For example, the boundary monitor 146 may provide the visual indicator of FIG. 12A when the RePA system is activated and mobile device 138 is outside of the boundary 702. In FIG. 12B, a larger portion of the array of LEDs 1202 is lit. For example, the boundary monitor 146 may provide the visual indicator of FIG. 12B when the RePA system is activated, mobile device 138 is inside of the boundary 702 near the edge of the boundary 702. In FIG. 12C, all of the LEDs in the array of LEDs 1202 are lit. For example, the boundary monitor 146 may provide the visual indicator of FIG. 12C when the RePA system is activated, mobile device 138 is inside of the boundary 702.

Figure 13:
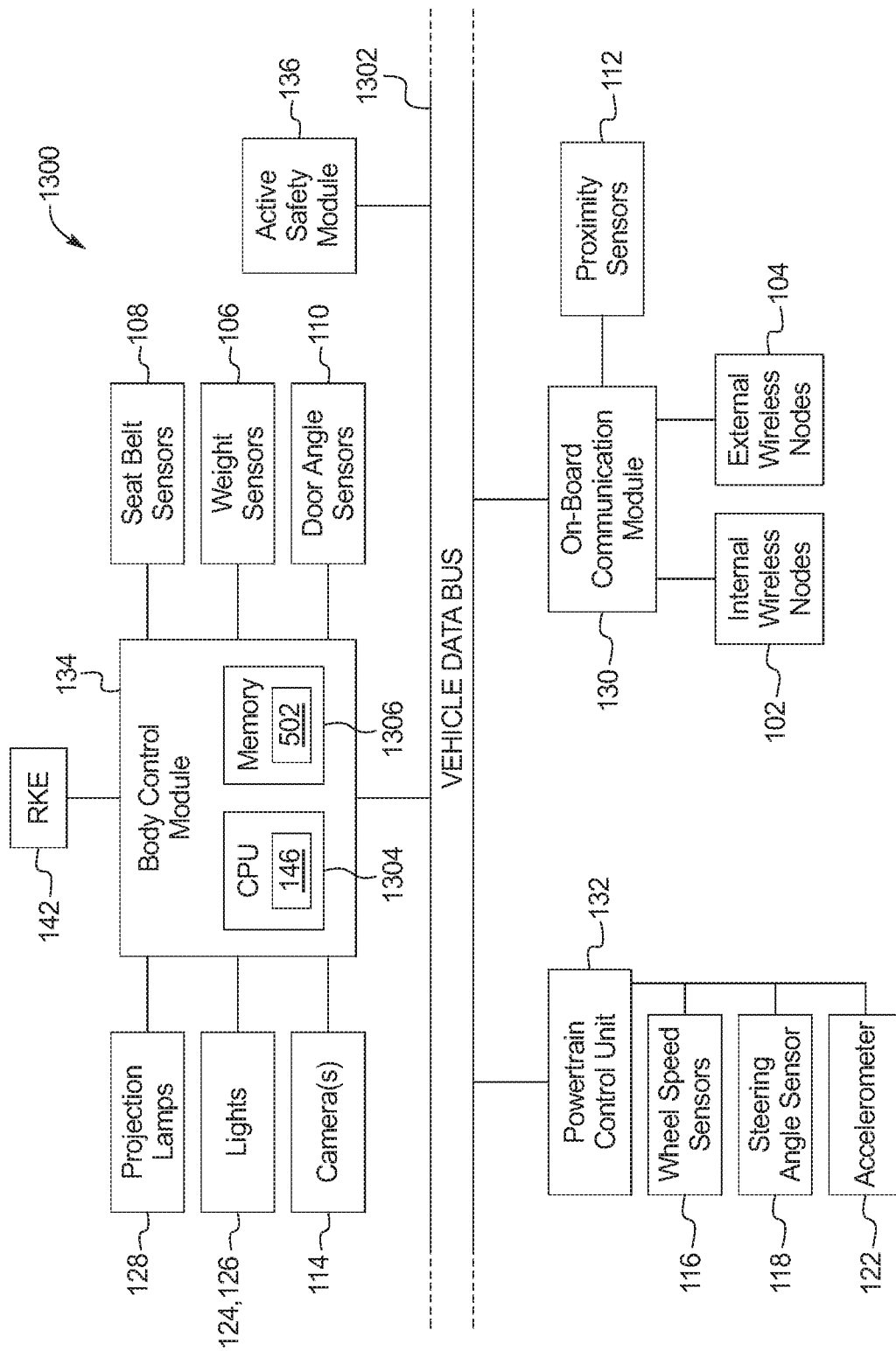
FIG. 13 is a block diagram of electronic components of the vehicle of FIG. 1.

FIG. 13 is a block diagram of electronic components 1300 of the vehicle 100 of FIG. 1. In the illustrated example, the electronic components 1300 include the wireless nodes 102 and 104, the occupant detection sensors 106, 108, and 110, the proximity sensors 112, the camera(s) 114, the trajectory sensors 116, 118, and 122, the lights 124 and 126, the projector lamps 128, the on-board communication module 130, the powertrain control module 132, the body control module 134, the active safety module 136, and a vehicle data bus 1302.

In the illustrated example, the body control module 134 includes a processor or controller 1304 and memory 1306. In some examples, the active safety module 136 also includes a processor or controller and memory. In the illustrated example, the body control module 134 is structured to include boundary monitor 146. Alternatively, in some examples, the active safety module 136 is structured to include boundary monitor 146. The processor or controller 1304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 1306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 1306 includes multiple kinds of memory, particularly volatile memory and non-volatile memory. In the illustrated example, the memory 1306 stores the database of mobile device specifications 502.

The memory 1306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 1306, the computer readable medium, and/or within the processor 1304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 1302 communicatively couples the on-board communication module 130, the powertrain control module 132, the body control module 134, and/or the active safety module 136, etc. In some examples, the vehicle data bus 1302 includes one or more data buses. The vehicle data bus 1302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 14:
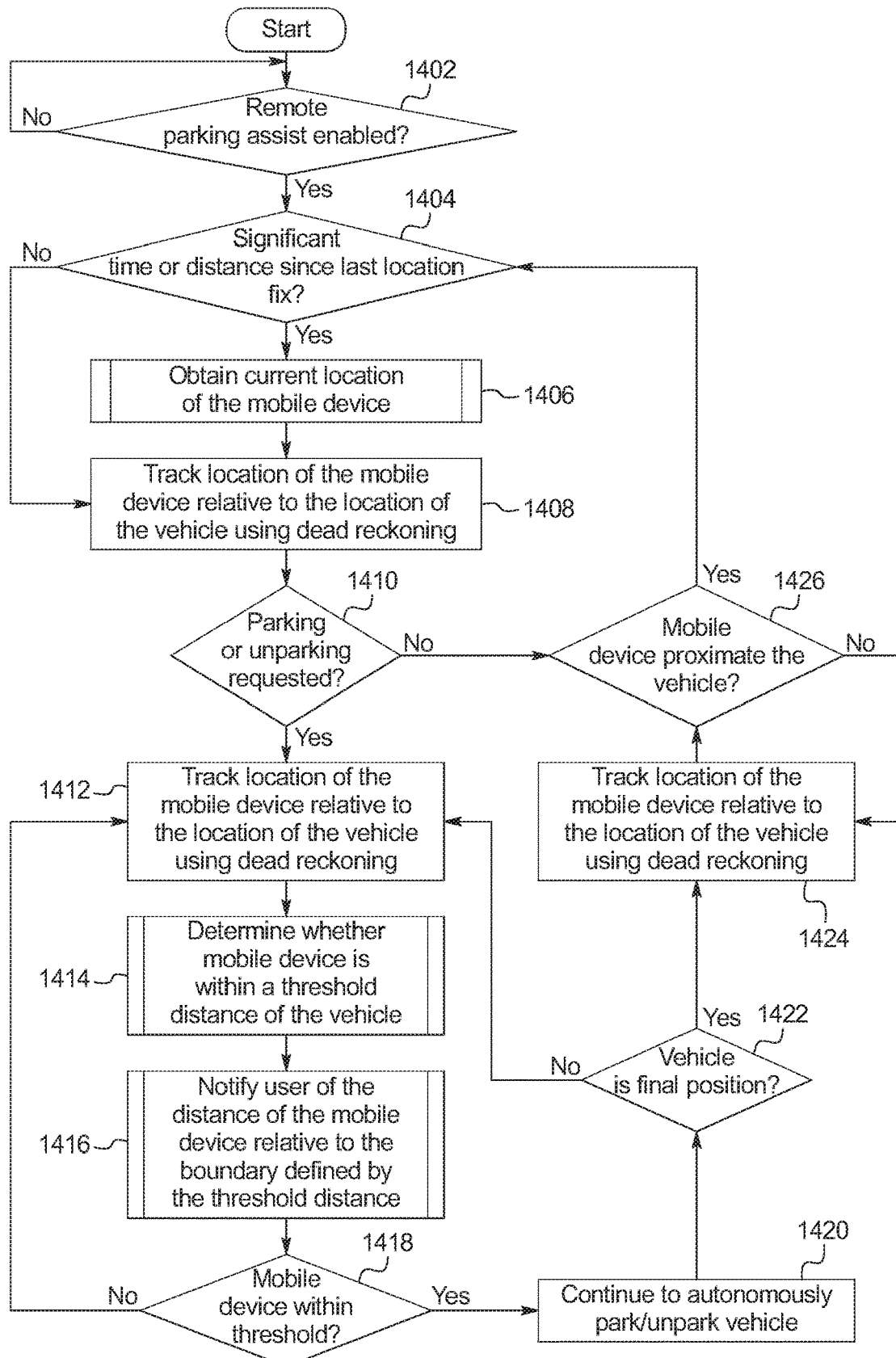
FIG. 14 is a flowchart of a method to perform remote assisted parking, which may be implemented by the electronic components of FIG. 13.

FIG. 14 is a flowchart of a method to perform remote assisted parking, which may be implemented by the electronic components 1300 of FIG. 13. Initially, at block 1402, the boundary monitor 146 waits until the RePA system of the active safety module 136 is enabled. In some examples, the RePA system is enabled remotely via the RePA application executing on the mobile device 138. Alternatively or additionally, in some examples, the RePA system is enabled via an interface (e.g., a touch screen interface) of an infotainment system. Additionally or alternatively, in some examples, the RePA system is enabled when the mobile device 138 communicatively couples with one of the proximity sensors 112. At block 1404, the boundary monitor 146 determines whether a significant amount of time has passed or the mobile device 138 has traveled a significant distance since the last location fix. In some examples, the boundary monitor 146 determines that a significant time has passed when it has been over 15 minutes since the last location fix. In some examples, the boundary monitor 146 determines that a significant distance has been traveled when the mobile device travels more than 18 meters. When a significant time has passed or a significant distance has been traveled, the method continues to block 1406. Otherwise, when a significant time has not passed and a significant distance has not been traveled, the method continues at block 1408. At block 1406, the boundary monitor 146 determines a current location of the mobile device 138. Example methods of obtaining the current location of the mobile device 138 are disclosed in connection with FIGS. 15, 18, and 19 below. At block 1408, the boundary monitor 146 tracks the location of the mobile device 138 using dead reckoning and/or localization techniques.

At block 1410, the boundary monitor 146 determines whether the mobile device 138 has sent a park or un-park request. When the mobile device 138 has sent a park or un-park request, the method continues at block 1412. Otherwise, when the mobile device 138 has not sent a park or un-park request, the method continues at block 1426. At block 1412, the boundary monitor 146 tracks the location of the mobile device 138 using dead reckoning and/or localization techniques. At block 1414, the boundary monitor 146 determines whether the mobile device 138 is within a threshold distance (e.g., is inside the boundary 702) of the vehicle 100. Example methods of determining whether the mobile device 138 is within a threshold distance of the vehicle 100 are disclosed in connection with FIGS. 20 and 21 below. At block 1416, the boundary monitor 146 notifies the user of the distance between the mobile device 138 and the vehicle 100 and/or the relationship of the mobile device 138 to the boundary 702. An example method to notify the user is disclosed in connection with FIG. 22 below. At block 1418, the boundary monitor 146 determines whether the mobile device 138 is within the boundary 702. When the mobile device 138 is within the boundary 702, the method continues at block 1420. Otherwise, when the mobile device 138 is not within the boundary 702, the method returns to block 1412.

At block 1420, the boundary monitor 146 enables the RePA system to move the vehicle 100 along a path to park or un-park the vehicle 100. At block 1422, the boundary monitor 146 determines whether the vehicle 100 is at a final position. For example, the boundary monitor 146 may determine whether the vehicle 100 is parked in the target parking space. As another example, the boundary monitor 146 may determine the vehicle has returned to a pre-parked position. When the vehicle 100 is at the final position, the method continues at block 1424. Otherwise, when the vehicle 100 is not at the final position, the method returned to block 1412.

At block 1424, the boundary monitor 146 tracks the location of the mobile device 138 using dead reckoning and/or localization techniques. At block 1426, the boundary monitor 146 determines whether the mobile device 138 is in the vicinity of the vehicle 100. For example, the boundary monitor 146 may determine that the mobile device 138 is in the vicinity of the vehicle 100 when the mobile device within 18 meters of the vehicle 100. When the mobile device 138 is within the vicinity of the vehicle 100, the method returns to block 1404. Otherwise, when the mobile device 138 is not within the vicinity of the vehicle 100, the method returns to block 1424.

Figure 15:
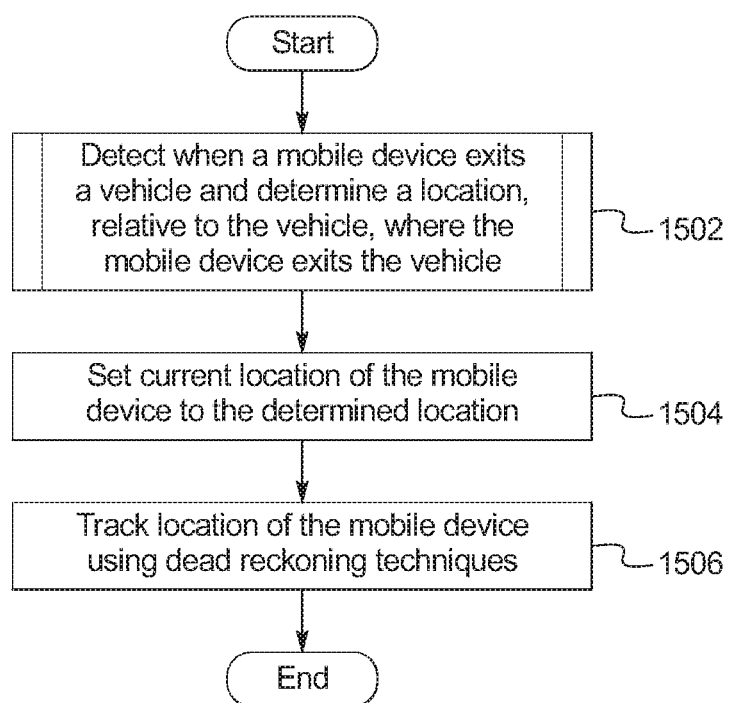
FIG. 15 is a flowchart of a method to determine an initial location of the mobile device when the mobile device exits the vehicle, which may be implemented by the electronic components of FIG. 13.

FIG. 15 is a flowchart of a method to determine an initial location of the mobile device 138 when the mobile device 138 exits the vehicle 100, which may be implemented by the electronic components 1300 of FIG. 13. At block 1502, the boundary monitor 146 detects when the mobile device 138 exits the vehicle 100 and determines a location, relative to the vehicle 100, wherein the mobile device 138 exits the vehicle 100. Example methods to detect when the mobile device 138 exits the vehicle 100 and determine a location, relative to the vehicle 100, wherein the mobile device 138 exits the vehicle 100 are disclosed in connection with FIGS. 16 and 17 below. At block 1504, the boundary monitor 146 sets the initial location of the mobile device 138 to the location determined at block 1502. At block 1506, the boundary monitor 146 tracks the location of the mobile device 138 using dead reckoning and/or localization techniques.

Figure 16:
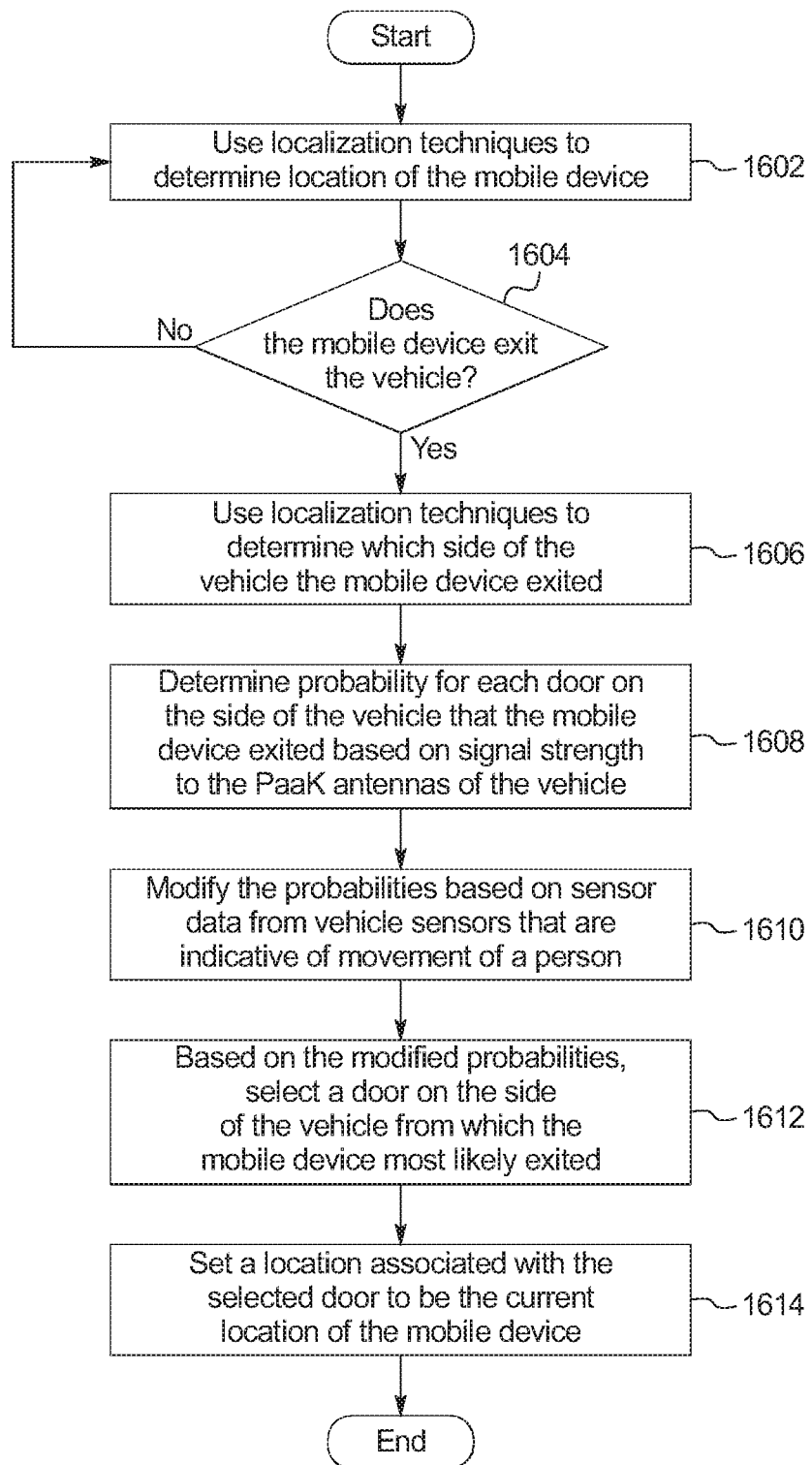
FIG. 16 is a flowchart of a method to determine an initial location of the mobile device using localization techniques, which may be implemented by the electronic components of FIG. 13.

FIG. 16 is a flowchart of a method to determine an initial location of the mobile device 138 using localization techniques, which may be implemented by the electronic components 1300 of FIG. 13. Initially, at block 1602, the boundary monitor 146 uses localization techniques with the internal wireless nodes 102 and the external wireless nodes 104 to determine the location of the mobile device 138 relative to the cabin of the vehicle 100 (e.g., inside the cabin or outside the cabin). At block 1604, the boundary monitor 146 determines whether the mobile device 138 exits the vehicle 100. When the mobile device 138 exits the vehicle 100, the method continues at block 1606. Otherwise, then the mobile device 138 remains in the vehicle 100, the method returns to block 1602.

At block 1606, the boundary monitor 146 using localization techniques with the internal wireless nodes 102 and the external wireless nodes 104 to determine which side of the vehicle 100 the mobile device 138 exited. At block 1608, the boundary monitor 146 determines a probability for each door 140 on the side of the vehicle 100 the mobile device 138 exited based on the signal strengths between the mobile device 138 and each of the external wireless nodes 104. At block 1610, the boundary monitor 146 modifies the probabilities based on measurements from one or more of the occupant detection sensors 104, 106 and 108. At block 1612, the boundary monitor 146 selects one of the doors 140 based on the modified probabilities. For example, when the mobile device 138 exits the passenger's side of the vehicle 100 in a timeframe that coincides with the back passenger's side door opening and closing, the boundary monitor 146 may select the back passenger's side door as the most likely door through which the mobile device 138 exited. At block 1614, the boundary monitor 146 sets a location 202 associated with the selected door 140 to be the current location of the mobile device 138.

Figure 17:
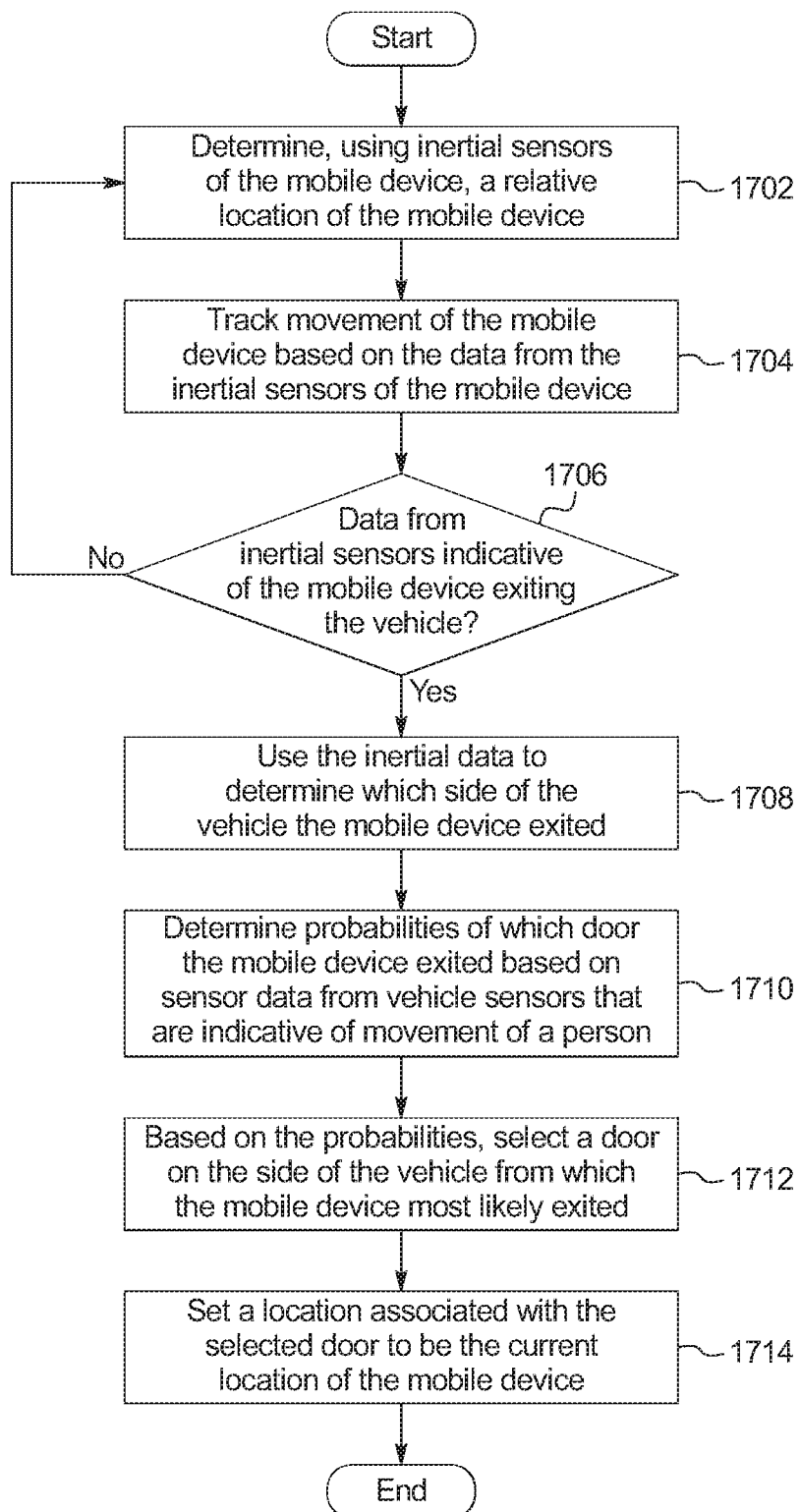
FIG. 17 is a flowchart of a method to determine an initial location of the mobile device using inertial sensors, which may be implemented by the electronic components of FIG. 13.

FIG. 17 is a flowchart of a method to determine an initial location of the mobile device 138 using inertial sensors 204 of the mobile device 138, which may be implemented by the electronic components 1300 of FIG. 13. Initially, at block 1702, the boundary monitor 146 determines a relative location of the mobile device 138 inside the vehicle 100 based on measurements of the inertial sensors 204 of the mobile device 138 (e.g., received via the internal wireless node 102, etc.). At block 1704, the boundary monitor 146 track the movement of the mobile device 138 inside the vehicle 100 based on measurements of the inertial sensors 204 of the mobile device 138. At block 1706, the boundary monitor 146 determines whether the data from the inertial sensors 204 of the mobile device 138 is indicative of the mobile device 138 exiting the vehicle 100. For example, the data from the inertial sensors 204 of the mobile device 138 may show movement in a direction greater than a width of the interior of the vehicle 100 or may indicate by the vertical movement of the mobile device 138 that the user moved in a pattern suggestive of exiting the vehicle 100. When the data from the inertial sensors 204 of the mobile device 138 is indicative of the mobile device 138 exiting the vehicle 100, the method continues at block 1708. Otherwise, when the data from the inertial sensors 204 of the mobile device 138 is not indicative of the mobile device 138 exiting the vehicle 100, the method returns to block 1702.

At block 1708 the boundary monitor 146 uses the data from the inertial sensors 204 of the mobile device 138 to determine which side of the vehicle 100 the mobile device 138 exited. At block 1710, the boundary monitor 146 determines a probability for each door 140 on the side of the vehicle 100 the mobile device 138 exited based on measurements from one or more of the occupant detection sensors 104, 106 and 108. At block 1712, the boundary monitor 146 selects one of the doors 140 based on the probabilities. At block 1714, the boundary monitor 146 sets a location 202 associated with the selected door 140 to be the current location of the mobile device 138.

Figure 18:
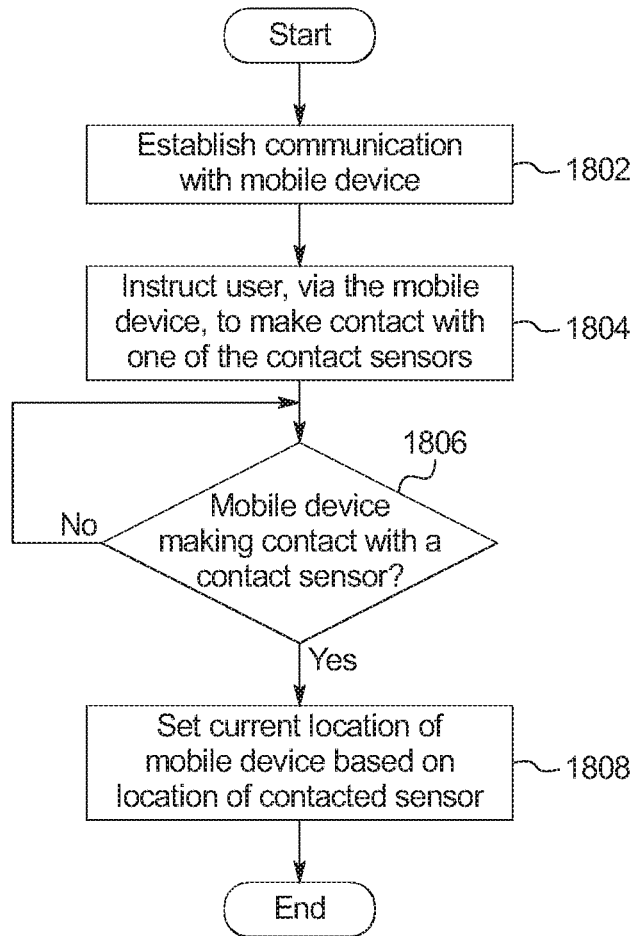
FIG. 18 is a flowchart of a method to determine an initial location of the mobile device using proximity sensors, which may be implemented by the electronic components of FIG. 13.

FIG. 18 is a flowchart of a method to determine an initial location of the mobile device 138 using the proximity sensors 112, which may be implemented by the electronic components 1300 of FIG. 13. Initially, at block 1802, the boundary monitor 146 establishes communication with the mobile device 138. At block 1804, the boundary monitor 146 instructs the user, via the corresponding application executing on the mobile device 138, to make contact with one of the proximity sensors 112. At block 1806, the boundary monitor 146 waits until the mobile device 138 makes contact with one of the proximity sensors 112. At block 1808, the boundary monitor 146 sets the current location of the mobile device 138 to the location of the contacted proximity sensor 112.

Figure 19:
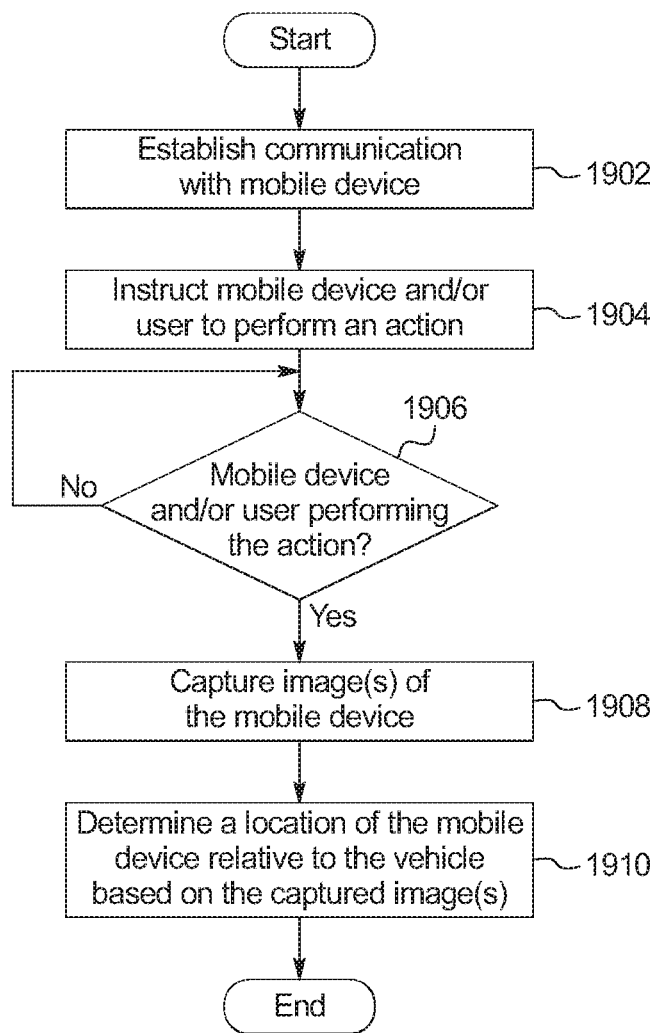
FIG. 19 is a flowchart of a method to determine an initial location of the mobile device using image analysis techniques, which may be implemented by the electronic components of FIG. 13.

FIG. 19 is a flowchart of a method to determine an initial location of the mobile device 138 using image analysis techniques, which may be implemented by the electronic components 1300 of FIG. 13. Initially, at block 1902, the boundary monitor 146 establishes communication with the mobile device 138. At block 1904, the boundary monitor 146 instructs the user, via the corresponding application executing on the mobile device 138, to perform an action. In some examples, the boundary monitor 146 instructs the operator to hold the mobile device 138 perpendicular to the longitudinal axis of the vehicle in view of one of the cameras 114. In some examples, boundary monitor 146 instructs the user to capture an image of a certain feature of the vehicle (e.g., a license plate frame, a sicker affixed the vehicle, etc.) with the mobile device 138. In some examples, boundary monitor 146 instructs the operator to point a flash 608 of the mobile device 138 at the camera 114 of the vehicle 100. At block 1906, the boundary monitor 146 waits until the mobile device 138 performs the action. At block 1908, the boundary monitor 146 (a) captures, with the camera 114, an image of the mobile device 138, (b) captures an intensity of the flash 608 of the mobile device 138, and/or (c) receives an image from the mobile device 138. At block 1910, the boundary monitor 146 determines the initial location of the mobile device based on an analysis of the captured image(s).

Figure 20:
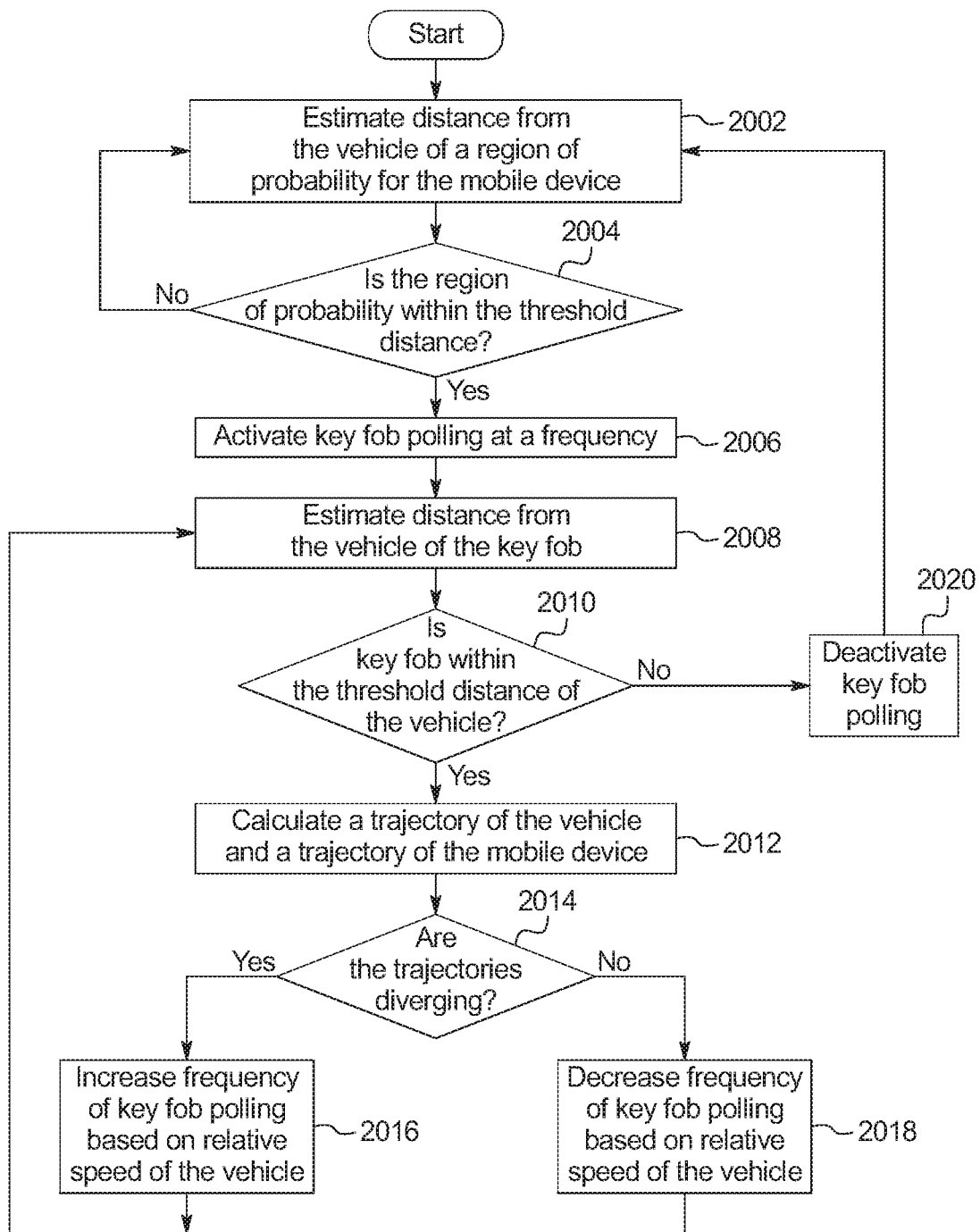
FIG. 20 is a flowchart of a method to determine whether the mobile device is within a distance of the vehicle based on comparing trajectories of the mobile device and the vehicle, which may be implemented by the electronic components of FIG. 13.

FIG. 20 is a flowchart of a method to determine whether the mobile device 138 is within a distance of the vehicle 100 based on comparing trajectories of the mobile device 138 and the vehicle 100, which may be implemented by the electronic components 1300 of FIG. 13. Initially, at block 2002, the boundary monitor 146 estimates the distance from the vehicle 100 to the mobile device 138 within a region of probability 706. At block 2004, the boundary monitor determines whether the region of probability 706 is within a threshold distance (e.g., within the boundary 702) of the vehicle 100. When the region of probability 706 is within the boundary 702, the method continues at block 2006. Otherwise, when the region of probability 706 is not within the boundary 702, the method returns to block 2002.

At block 2006, the boundary monitor 146 activates the key fob polling at an initial polling interval. At block 2008, the boundary monitor 146 estimates the distance from the vehicle 100 to the key fob 144. At block 2010, the boundary monitor 146 determines whether the key fob 144 is within the boundary 702. When the key fob 144 is within the boundary 702, the method continues at block 2012. Otherwise, the method continues at block 2020. At block 2012, the boundary monitor 146 calculates a trajectory of the vehicle 100 based on measurements from one or more of the trajectory sensors 116, 118, and 122. The boundary monitor 146 also calculates the trajectory of the mobile device 138 based on measurements of the inertial sensors 204 of the mobile device 138 that are received from the mobile device 138. At block 2014, the boundary monitor 146 determines whether the location of the mobile device 138 and the location of the vehicle 100 are diverging. When the location of the mobile device 138 and the location of the vehicle 100 are diverging, the method continues at block 2016. Otherwise, when the location of the mobile device 138 and the location of the vehicle 100 are not diverging, the method continues at block 2018.

At block 2016, the boundary monitor 146 increases the polling interval of the key fob 144 based on the rate at which the location of the mobile device 138 and the location of the vehicle 100 are diverging. At block 2018, the boundary monitor 146 decreases the polling interval of the key fob 144 based on the rate at which the location of the mobile device 138 and the location of the vehicle 100 are converging.

At block 2020, the boundary monitor 146 deactivates key fob polling.

Figure 21:
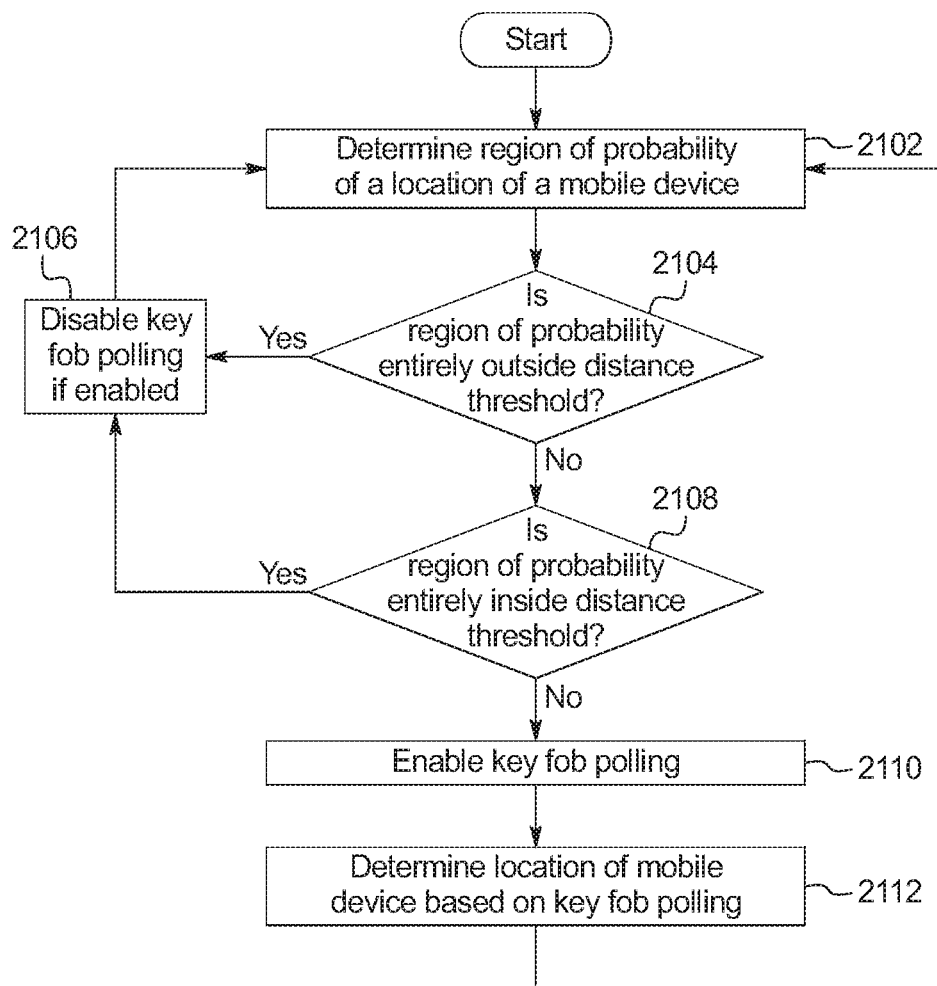
FIG. 21 is a flowchart of a method to determine whether the mobile device is within a distance of the vehicle based on regions of probability, which may be implemented by the electronic components of FIG. 13.

FIG. 21 is a flowchart of a method to determine whether the mobile device 138 is within a distance of the vehicle 100 based on regions of probability 706, which may be implemented by the electronic components 1300 of FIG. 13. Initially, at block 2102, the boundary monitor 146 determines a region of probability 706 of a location of the mobile device 100. At block 2104, the boundary monitor 146 determines whether the region of probability 706 is entirely outside the boundary 702. When the region of probability 706 is entirely outside the boundary 702, the method continues at block 2106. When the region of probability 706 is not entirely outside the boundary 702, the method continues at block 2108.

At block 2106, the boundary monitor 146 disables key fob polling if enabled.

At block 2108, the boundary monitor 146 determines whether the region of probability 706 is entirely within the boundary 702. When the region of probability 706 is entirely inside the boundary 702, the method continues at block 2106. Otherwise, when the region of probability is not entirely inside the boundary 702, the method continues at block 2110.

At block 2110, the boundary monitor 146 enables key fob polling. At block 2112, the boundary monitor 146 estimates the location of the mobile device 138 based on the key fob polling.

Figure 22:
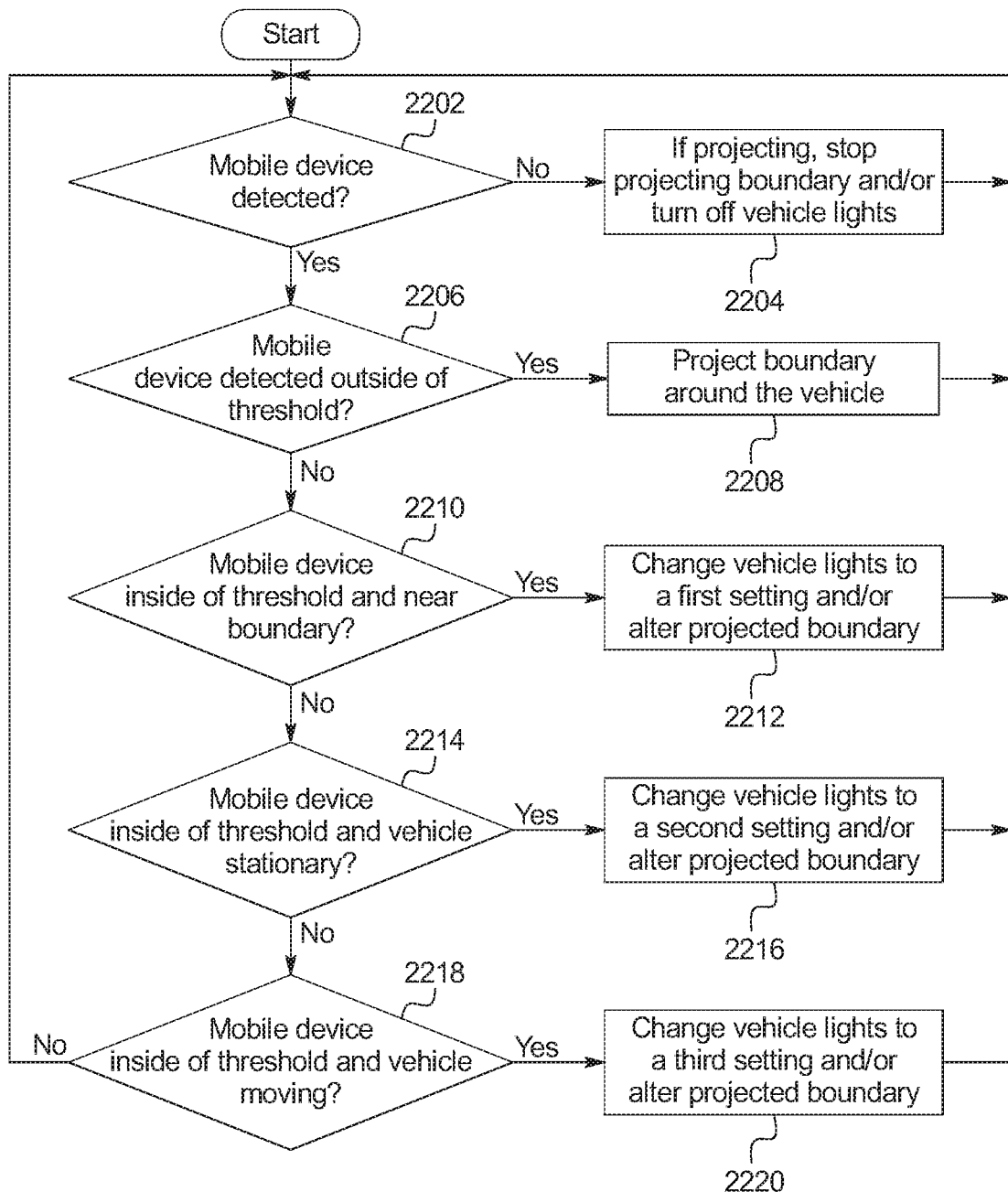
FIG. 22 is a flowchart of a method to visually indicate when the mobile device is within a distance of the vehicle, which may be implemented by the electronic components of FIG. 13.

FIG. 22 is a flowchart of a method to visually indicate when the mobile device 138 is within a distance of the vehicle 100, which may be implemented by the electronic components 1300 of FIG. 13. At block 2202, the boundary monitor 146 determines whether the mobile device 138 is detected. When the mobile device 138 is not detected, the method continues at block 2204. Otherwise, when the mobile device 138 is detected, the method continues at block 2206. At block 2204, the boundary monitor 146 stops projecting the representation 902 of the boundary 702 and/or turns off the lights 124 and 126 of the vehicle 100.

At block 2206, the boundary monitor 146 determines whether the mobile device 138 is detected outside of the boundary 702. When the mobile device 138 is detected outside of the boundary 702, the method continues at block 2208. Otherwise, when the mobile device 138 is detected inside of the boundary 702, the method continues at block 2210. At block 2208, the boundary monitor 146 projects, via the projector lamps 128, the representation 902 of the boundary 702.

At block 2210, the boundary monitor 146 determines whether the mobile device 138 is detected inside of the boundary 702 and is near an edge of the boundary 702. When the mobile device 138 is detected inside of the boundary 702 and is near an edge of the boundary 702, the method continues at block 2212. Otherwise, when the mobile device 138 is detected inside of the boundary 702 and but is not near an edge of the boundary 702, method continues at block 2214. At block 2212, the boundary monitor 146 changes the lights 124 and 126 to a first setting and/or alters the projection of the representation 902 of the boundary 702. For example, the boundary monitor 146 may cause the lights 124 and 126 and/or the projector lamp 128 to have a yellow tint. As another example, the boundary monitor 146 may cause the lights 124 and 126 to flash in a pattern and the representation 902 of the boundary 702 to be animated as a dashed line that fades in and out.

At block 2214, the boundary monitor 146 determines whether the mobile device 138 is inside the boundary 702 and the vehicle 100 is stationary. When the mobile device 138 is inside the boundary 702 and the vehicle 100 is stationary, the method continues at block 2216. Otherwise, when the mobile device 138 is inside the boundary 702 and the vehicle 100 is not stationary, the method continues at block 2218. At block 2216, the boundary monitor 146 changes the lights 124 and 126 to a second setting and/or alters the projected representation 902 of the boundary 702. For example, the boundary monitor 146 may cause the lights 124 and 126 and/or the projector lamp 128 to have a solid green tint.

At block 2218, the boundary monitor 146 determines whether the mobile device 138 is inside the boundary 702 and the vehicle 100 is in motion. When the mobile device 138 is inside the boundary 702 and the vehicle 100 is in motion, the method continues at block 2220. Otherwise, when the mobile device 138 is inside the boundary 702 and the vehicle 100 is not in motion, the method returns to block 2202. At block 2220, the boundary monitor 146 changes the lights 124 and 126 to a third setting and/or alters the projected representation 902 of the boundary 702. For example, the boundary monitor 146 may cause the lights 124 and 126 and/or the projector lamp 128 to have a blinking green tint. As another example, the boundary monitor 146 may cause the representation 902 of the boundary 702 to be animated to indicate the direction of travel such that the representation 902 is animated as a dashed representation 902 of the boundary 702 where the dashes move in the direction the vehicle 100 is turning and/or moving.

The flowcharts of FIGS. 14, 15, 16, 17, 18, 19, 20, 21, and 22 are representative of machine readable instructions stored in memory (such as the memory 1306 of FIG. 13 above) that comprise one or more programs that, when executed by a processor (such as the processor 1304 of FIG. 13 above), cause the vehicle 100 to implement the example boundary monitor 146 and/or, more generally, the example body control module 134 of FIGS. 1, 2, 3, 5, 7, 8A, 8B, 8C, and/or 9. Further, although the example program(s) is/are described with reference to the flowchart illustrated in FIGS. 14, 15, 16, 17, 18, 19, 20, 21, and 22, many other methods of implementing the example boundary monitor 146 and/or, more generally, the example body control module 134 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

In some examples, the vehicle 100 includes projection lamps 128 and a body control module 134. The body control module 134 determines a distance of a mobile device 138 from the vehicle 100. The body control module 134 also projects a representation 902 of a boundary 702 around the vehicle 100 using the projection lamps 128 and modifies the representation 902 of the boundary 702 based on the distance of the mobile device 138 from the vehicle 100 and an operational state of the vehicle 100. In some examples, the body control module 134 modifies the representation 902 of the boundary 702 when (a) autonomous parking is enabled and (b) in response to attempting to determine the distance of the mobile device 138 from the vehicle 100, the mobile device 138 is not detected. In some such examples, to modify the representation of the boundary, the body control module projects the representation of the boundary as a blinking red line when (a) autonomous parking is enabled and (b) in response to attempting to determine the distance of the mobile device 138 from the vehicle 100, the mobile device 138 is not detected. In some examples, the body control module 134 modifies the representation 902 of the boundary 702 when (a) autonomous parking is enabled and (b) the distance of the mobile device 138 from the vehicle 100 is greater than a threshold distance indicated by the representation 902 of the boundary 702. In some such examples, to modify the representation 902 of the boundary 702, the body control module 134 projects the representation 902 of the boundary 702 as a solid red line when (a) autonomous parking is enabled and (b) the distance of the mobile device 138 from the vehicle 100 is greater than a threshold distance indicated by the representation 902 of the boundary 702.

In some examples, the body control module 134 modifies the representation 902 of the boundary 702 when (a) autonomous parking is enabled and (b) the distance of the mobile device 138 from the vehicle 100 is less than a threshold distance indicated by the representation 902 of the boundary 702, and (c) the vehicle 100 is stationary. In some such examples, to modify the representation 902 of the boundary 702, the body control module 134 projects the representation 902 of the boundary 702 as a solid green line when (a) autonomous parking is enabled and (b) the distance of the mobile device 138 from the vehicle 100 is less than a threshold distance indicated by the representation 902 of the boundary 702, and (c) the vehicle 100 is stationary. In some such examples, to modify the representation 902 of the boundary 702, the body control module 134 projects the representation 902 of the boundary 702 as a dashed line when (a) autonomous parking is enabled and (b) the distance of the mobile device 138 from the vehicle 100 is less than a threshold distance indicated by the representation 902 of the boundary 702, and (c) the vehicle 100 is stationary. In some examples, the body control module 134 modifies the representation 902 of the boundary 702 when (a) autonomous parking is enabled and (b) the distance of the mobile device 138 from the vehicle 100 is less than a threshold distance indicated by the representation 902 of the boundary 702, and (c) the vehicle 100 is in motion. In some such examples, to modify the representation 902 of the boundary 702, the body control module 134 projects the representation 902 of the boundary 702 as a blinking green line when (a) autonomous parking is enabled and (b) the distance of the mobile device 138 from the vehicle is less than a threshold distance indicated by the representation 902 of the boundary 702, and (c) the vehicle 100 is in motion. In some such examples, to modify the representation 902 of the boundary 702, the body control module 134 projects the representation 902 of the boundary 702 as an animated dashed line when (a) autonomous parking is enabled and (b) the distance of the mobile device 138 from the vehicle 100 is less than a threshold distance indicated by the representation 902 of the boundary 702, and (c) the vehicle 100 is in motion. In some such examples, the animated dashed line is animated to indicate a direction of travel of the vehicle 100.

In some examples, the body control module 134 modifies the representation 902 of the boundary 702 when (a) autonomous parking is enabled and (b) the distance of the mobile device 138 from the vehicle 100 is less than a threshold distance indicated by the representation 902 of the boundary 702, and (c) the mobile device 138 is proximate the threshold distance. In some such examples, to modify the representation 902 of the boundary 702, the body control module 134 projects the representation 902 of the boundary 702 as a yellow line when (a) autonomous parking is enabled and (b) the distance of the mobile device 138 from the vehicle is less than a threshold distance indicated by the representation 902 of the boundary 702, and (c) the mobile device 138 is proximate the threshold distance.

In some examples, the body control module, when autonomous parking is enabled, (a) modifies the representation 902 of the boundary 702 to display a first pattern when in response to determining the distance of the mobile device 138 from the vehicle 100, the mobile device is not detected, and (b) modifies the representation 902 of the boundary 702 to display a second pattern when the distance of the mobile device 138 from the vehicle is greater than a threshold distance indicated by the representation 902 of the boundary 702. In some such examples, when autonomous parking is enabled and the distance of the mobile device 138 from the vehicle 100 is less than a threshold distance indicated by the representation 902 of the boundary 702, the body control module 134 (a) modifies the representation 902 of the boundary 702 to display a third pattern when the vehicle 100 is stationary, and (b) modifies the representation 902 of the boundary 702 to display a fourth pattern when the vehicle 100 is in motion. In some such examples, when autonomous parking is enabled, the distance of the mobile device 138 from the vehicle 100 is less than a threshold distance indicated by the representation 902 of the boundary 702, and the mobile device 138 is proximate the threshold distance, the body control module 134 (a) modifies the representation 902 of the boundary 702 to display a fifth pattern when the vehicle 100 is stationary, and (b) modifies the representation 902 of the boundary 702 to display a sixth pattern when the vehicle 100 is in motion.

In some examples, the vehicle 100 includes a lighting fixture 126 and 126 comprising individually controllable lighting elements (such as, the lighting elements 1004, 1006 and 1008 of FIGS. 10A, 10B, and 10C, the lighting elements 1102, 1104, and 1106 of FIGS. 11A, 11B, and 11C, and/or the lighting elements 1202 of FIGS. 12A, 12B, and 12C). In such examples, the body control module 134 illuminates particular ones of the lighting elements based on the distance of the mobile device 138 from the vehicle 100 and an operational state of the vehicle 100. In some such examples, the lighting elements include light emitting diodes. Alternatively or additionally, in some such examples, the lighting elements include headlights and an illuminating vehicle badge.

What is claimed is:

1. A vehicle comprising:
    projection lamps; and
    a body control module to:
        determine a distance of a mobile device from the vehicle by using wireless communication between the mobile device and the body control module;
        project a representation of a boundary around the vehicle via the projection lamps;
        modify the representation of the boundary based on the distance of the mobile device from the vehicle and an operational state of the vehicle.

2. The vehicle of claim 1, wherein the body control module is to modify the representation of the boundary when (a) autonomous parking is enabled and (b) in response to attempting to determine the distance of the mobile device from the vehicle, the mobile device is not detected.

3. The vehicle of claim 2, wherein to modify the representation of the boundary, the body control module is to project the representation of the boundary as a blinking red line when (a) autonomous parking is enabled and (b) in response to attempting to determine the distance of the mobile device from the vehicle, the mobile device is not detected.

4. The vehicle of claim 1, wherein the body control module is to modify the representation of the boundary when (a) autonomous parking is enabled and (b) the distance of the mobile device from the vehicle is greater than a threshold distance indicated by the representation of the boundary.

5. The vehicle of claim 4, wherein to modify the representation of the boundary, the body control module is to project the representation of the boundary as a solid red line when (a) autonomous parking is enabled and (b) the distance of the mobile device from the vehicle is greater than a threshold distance indicated by the representation of the boundary.

6. The vehicle of claim 1, wherein the body control module is to modify the representation of the boundary when (a) autonomous parking is enabled and (b) the distance of the mobile device from the vehicle is less than a threshold distance indicated by the representation of the boundary, and (c) the vehicle is stationary.

7. The vehicle of claim 6, wherein to modify the representation of the boundary, the body control module is to project the representation of the boundary as a solid green line when (a) autonomous parking is enabled and (b) the distance of the mobile device from the vehicle is less than a threshold distance indicated by the representation of the boundary, and (c) the vehicle is stationary.

8. The vehicle of claim 6, wherein to modify the representation of the boundary, the body control module is to project the representation of the boundary as a dashed line when (a) autonomous parking is enabled and (b) the distance of the mobile device from the vehicle is less than a threshold distance indicated by the representation of the boundary, and (c) the vehicle is stationary.

9. The vehicle of claim 1, wherein the body control module is to modify the representation of the boundary when (a) autonomous parking is enabled and (b) the distance of the mobile device from the vehicle is less than a threshold distance indicated by the representation of the boundary, and (c) the vehicle is in motion.

10. The vehicle of claim 9, wherein to modify the representation of the boundary, the body control module is to project the representation of the boundary as a blinking green line when (a) autonomous parking is enabled and (b) the distance of the mobile device from the vehicle is less than a threshold distance indicated by the representation of the boundary, and (c) the vehicle is in motion.

11. The vehicle of claim 9, wherein to modify the representation of the boundary, the body control module is to project the representation of the boundary as an animated dashed line when (a) autonomous parking is enabled and (b) the distance of the mobile device from the vehicle is less than a threshold distance indicated by the representation of the boundary, and (c) the vehicle is in motion.

12. The vehicle of claim 11, wherein the animated dashed line is animated to indicate a direction of travel of the vehicle.

13. The vehicle of claim 1, wherein the body control module is to modify the representation of the boundary when (a) autonomous parking is enabled and (b) the distance of the mobile device from the vehicle is less than a threshold distance indicated by the representation of the boundary, and (c) the mobile device is proximate the threshold distance.

14. The vehicle of claim 13, wherein to modify the representation of the boundary, the body control module is to project the representation of the boundary as a yellow line when (a) autonomous parking is enabled and (b) the distance of the mobile device from the vehicle is less than a threshold distance indicated by the representation of the boundary, and (c) the mobile device is proximate the threshold distance.

15. The vehicle of claim 1, wherein the body control module is to, when autonomous parking is enabled:
    modify the representation of the boundary to display a first pattern when in response to determining the distance of the mobile device from the vehicle, the mobile device is not detected; and
    modify the representation of the boundary to display a second pattern when the distance of the mobile device from the vehicle is greater than a threshold distance indicated by the representation of the boundary.

16. The vehicle of claim 15, wherein the body control module is to, when autonomous parking is enabled and the distance of the mobile device from the vehicle is less than a threshold distance indicated by the representation of the boundary:
    modify the representation of the boundary to display a third pattern when the vehicle is stationary; and
    modify the representation of the boundary to display a fourth pattern when the vehicle is in motion.

17. The vehicle of claim 16, wherein the body control module is to, when autonomous parking is enabled, the distance of the mobile device from the vehicle is less than a threshold distance indicated by the representation of the boundary, and the mobile device is proximate the threshold distance:
    modify the representation of the boundary to display a fifth pattern when the vehicle is stationary; and modify the representation of the boundary to display a sixth pattern when the vehicle is in motion.

18. The vehicle of claim 1, including a lighting fixture comprising individually controllable lighting elements, and wherein the body control module is to illuminate particular ones of the lighting elements based on the distance of the mobile device from the vehicle and an operational state of the vehicle.

19. The vehicle of claim 18, wherein the lighting elements include light emitting diodes.

20. The vehicle of claim 18, wherein the lighting elements include headlights and an illuminating vehicle badge.

* * * * *